United States Patent
Fujimoto

(10) Patent No.: US 11,200,913 B2
(45) Date of Patent: Dec. 14, 2021

(54) MAGNETIC RECORDING MEDIUM, MANUFACTURING METHOD OF ε-TYPE IRON OXIDE PARTICLES, AND MANUFACTURING METHOD OF MAGNETIC RECORDING MEDIUM

(71) Applicant: FUJIFILM Corporation, Tokyo (JP)

(72) Inventor: Takashi Fujimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/802,017

(22) Filed: Feb. 26, 2020

(65) Prior Publication Data

US 2020/0279582 A1    Sep. 3, 2020

(30) Foreign Application Priority Data

Feb. 28, 2019  (JP) .............................. JP2019-035760

(51) Int. Cl.
| | | |
|---|---|---|
| *G11B 5/706* | (2006.01) | |
| *G11B 5/714* | (2006.01) | |
| *G11B 5/73* | (2006.01) | |
| *G11B 5/84* | (2006.01) | |
| *C01G 49/06* | (2006.01) | |
| *B82Y 25/00* | (2011.01) | |
| *B82Y 40/00* | (2011.01) | |

(52) U.S. Cl.
CPC .......... *G11B 5/73917* (2019.05); *C01G 49/06* (2013.01); *G11B 5/70642* (2013.01); *G11B 5/714* (2013.01); *G11B 5/8404* (2013.01); *B82Y 25/00* (2013.01); *B82Y 40/00* (2013.01); *C01P 2004/54* (2013.01); *C01P 2004/64* (2013.01); *C01P 2006/42* (2013.01)

(58) Field of Classification Search
None
See application file for complete search history.

(56) References Cited

U.S. PATENT DOCUMENTS

| | | | |
|---|---|---|---|
| 11,074,935 B2* | 7/2021 | Naoi | G11B 5/5926 |
| 2005/0175865 A1 | 8/2005 | Ejiri | |
| 2015/0111066 A1 | 4/2015 | Terakawa et al. | |
| 2017/0162220 A1 | 6/2017 | Nakashio et al. | |
| 2018/0208479 A1* | 7/2018 | Sakane | G11B 5/714 |
| 2018/0358045 A1 | 12/2018 | Fujimoto | |
| 2018/0358046 A1* | 12/2018 | Shirata | G11B 5/70642 |
| 2018/0358155 A1* | 12/2018 | Naoi | H01F 1/0054 |
| 2019/0228889 A1* | 7/2019 | Yamaga | H01F 1/11 |
| 2019/0295584 A1* | 9/2019 | Terakawa | G11B 5/714 |
| 2019/0300380 A1* | 10/2019 | Naoi | C01G 49/02 |
| 2021/0027807 A1* | 1/2021 | Toyosawa | G11B 5/70605 |

FOREIGN PATENT DOCUMENTS

| | | |
|---|---|---|
| JP | 7-210852 A | 8/1995 |
| JP | 2005-222604 A | 8/2005 |
| JP | 6318540 B2 | 5/2018 |
| JP | 2019-003970 A | 1/2019 |
| WO | 2015/198514 A1 | 12/2015 |
| WO | 2018/062478 A1 | 4/2018 |

OTHER PUBLICATIONS

Notice of Reasons for Refusal dated Sep. 14, 2021 by the Japanese Patent Office in Japanese English Application No. 2019-035760.

* cited by examiner

*Primary Examiner* — Kevin M Bernatz

(74) *Attorney, Agent, or Firm* — Sughrue Mion, PLLC

(57) ABSTRACT

Embodiments include a magnetic recording medium containing ε-type iron oxide particles and having excellent SNR, a manufacturing method of ε-type iron oxide particles, and a manufacturing method of a magnetic recording medium. High SNR is achieved by a magnetic recording medium containing ε-type iron oxide particles, in which a coefficient of variation of an aspect ratio of the ε-type iron oxide particles is equal to or smaller than 18%, and a squareness ratio of the magnetic recording medium measured in a longitudinal direction of the magnetic recording medium is higher than 0.3 and equal to or lower than 0.5. The object is also achieved by the application of the magnetic recording medium.

2 Claims, No Drawings

MAGNETIC RECORDING MEDIUM, MANUFACTURING METHOD OF ε-TYPE IRON OXIDE PARTICLES, AND MANUFACTURING METHOD OF MAGNETIC RECORDING MEDIUM

CROSS-REFERENCE TO RELATED APPLICATIONS

This application claims priority from Japanese Patent Application No. 2019-035760 filed Feb. 28, 2019, and the disclosure of which is incorporated herein by reference in their entirety.

BACKGROUND OF THE INVENTION

1. Field of the Invention

The present disclosure relates to a magnetic recording medium, a manufacturing method of ε-type iron oxide particles, and a manufacturing method of a magnetic recording medium.

2. Description of the Related Art

In recent years, with the improvement of the performance of magnetic recording media, as a magnetic material used in the magnetic recording media, particles of ε-type iron oxide (hereinafter, referred to as "ε-$Fe_2O_3$"" or "ε-iron oxide" as well), which are nanosized particles but express extremely high coercivity, have drawn attention.

With the improvement of the performance of magnetic recording media and the increase of the density of magnetic recording media, in order to respond to the magnetic recording media, a high-capacity magnetic recording/reproducing system using a high sensitivity reproducing head such as a Magneto-Resistance (MR) head has been suggested. The magnetic recording media are required to bring about a high Signal to Noise Ratio (SNR) even though signals are reproduced using a high sensitivity reproducing head.

As one of the magnetic recording media from which high SNR can be obtained even though a high-capacity magnetic recording/reproducing system is used, a magnetic recording medium has been suggested which has a magnetic layer containing ε-$Fe_2O_3$ as magnetic powder, in which the product of a residual magnetization of the magnetic layer measured in a vertical direction thereof and a thickness and of the magnetic layer is equal to or greater than 0.5 mA and equal to or smaller than 6.0 mA, and a squareness ratio of the magnetic layer measured in a longitudinal direction thereof is equal to or lower than 0.3 (see Japanese Patent No. 6318540).

SUMMARY OF THE INVENTION

In a magnetic recording medium having a magnetic layer in which a magnetic material containing ε-iron oxide particles are used, Switching field distribution (SFD) is wide. Therefore, sometimes a recording density improving effect resulting from expected excellent SNR is not obtained.

In the magnetic recording medium described in Japanese Patent No. 6318540, the squareness ratio measured in the longitudinal direction is specified as being equal to or lower than 0.3. An ideal squareness ratio in the longitudinal direction is regarded as 0. The squareness ratio equal to or lower than 0.3 measured in the longitudinal direction shows that magnetic materials are extremely well aligned along the vertical direction for a non-magnetic support included in the magnetic recording medium. However, unfortunately, it is difficult to efficiently manufacture a magnetic layer having such a squareness ratio.

The inventors of the present invention paid attention to the uniformity of magnetic materials that is exhibited in a case where ε-iron oxide particles are used in a magnetic layer of a magnetic recording medium, and repeated various examinations. As a result, it has been revealed that for obtaining the uniformity, it is effective to reduce a coefficient of variation of an aspect ratio of ε-type iron oxide particles.

An object to be achieved by an embodiment of the present invention is to provide a magnetic recording medium which contains ε-type iron oxide particles and has excellent in SNR.

An object to be achieved by another embodiment of the present invention is to provide a manufacturing method of ε-type iron oxide particles that is useful for manufacturing a magnetic recording medium having excellent SNR and can form magnetic powder having a small coefficient of variation of an aspect ratio.

An object to be achieved by still another embodiment of the present invention is to provide a manufacturing method of a magnetic recording medium which contains ε-type iron oxide particles and has excellent SNR.

Means for achieving the aforementioned objects include the following aspects.

<1> A magnetic recording medium containing ε-type iron oxide particles, in which a coefficient of variation of an aspect ratio of the ε-type iron oxide particles is equal to or smaller than 18%, and a squareness ratio of the magnetic recording medium measured in a longitudinal direction of the magnetic recording medium is higher than 0.3 and equal to or lower than 0.5.

<2> The magnetic recording medium described in <1>, in which the aspect ratio of the ε-type iron oxide particles is within a range of 1.00 to 1.35.

<3> The magnetic recording medium described in <1> or <2>, in which an average equivalent circular diameter of the ε-type iron oxide particles is within a range of 8.0 nm to 15.0 nm.

<4> A manufacturing method of ε-type iron oxide particles, including a step A of mixing together water, a compound containing trivalent iron ions, and at least one kind of metal compound containing a metallic element other than iron so as to prepare a mixed solution containing iron ions, a step B of adding an alkali agent to the mixed solution obtained by the step A while stirring the mixed solution and stirring the mixed solution while keeping the mixed solution at a temperature equal to or higher than 0° C. and equal to or lower than 25° C., a step C of heating the mixed solution obtained by the step B and stirring the mixed solution while keeping the mixed solution at a liquid temperature higher than 30° C. and equal to or lower than 90° C., and a step D of extracting powder from the mixed solution obtained by the step C and performing a heat treatment on the obtained powder so as to obtain heat-treated powder, in which a coefficient of variation of an aspect ratio of the ε-type iron oxide particles is equal to or smaller than 18%.

<5> The manufacturing method of ε-type iron oxide particles described in <4>, in which a temperature of the heat treatment in the step D is within a range equal to or higher than 800° C. and equal to or lower than 1,400° C.

<6> A manufacturing method of a magnetic recording medium, including a step E of preparing a composition for forming a magnetic layer containing the ε-type iron oxide particles obtained by the manufacturing method described in <4> or <5> and organic solvents, a step F of applying the composition for forming a magnetic layer to a non-magnetic support so as to form a layer of the composition for forming a magnetic layer, a step G of performing a magnetic field alignment treatment on the formed layer of the composition for forming a magnetic layer, and a step H of drying the layer of the composition for forming a magnetic layer having undergone the magnetic field alignment treatment so as to form a magnetic layer, in which a content ratio of an organic solvent having a boiling point equal to or higher than 150° C. in all the organic solvents used for preparing the composition for forming a magnetic layer by the step E is 5% by mass to 40% by mass.

According to an embodiment of the present invention, it is possible to provide a magnetic recording medium which contains ε-type iron oxide particles and has excellent in SNR.

According to another embodiment of the present invention, it is possible to provide a manufacturing method of ε-type iron oxide particles that can form magnetic powder which is useful for manufacturing a magnetic recording medium having excellent SNR and has a small coefficient of variation of an aspect ratio.

According to still another embodiment of the present invention, it is possible to provide a manufacturing method of a magnetic recording medium which contains ε-type iron oxide particles and has excellent SNR.

DESCRIPTION OF THE PREFERRED EMBODIMENTS

Hereinafter, an example of a magnetic recording medium, a manufacturing method of ε-type iron oxide particles, and a manufacturing method of a magnetic recording medium of the present disclosure will be specifically described. However, the present invention is not limited to the following embodiment. Within the intended scoped of the present disclosure, the present invention can be embodied by adding modification as appropriate.

In the present disclosure, a range of numerical values described using "to" means a range including the numerical values listed before and after "to" as a minimum value and a maximum value respectively.

Regarding the ranges of numerical values stepwise described in the present disclosure, the upper limit or the lower limit described in a certain range of numerical values may be substituted with the upper limit or the lower limit of another range of numerical values stepwise described. Furthermore, regarding the range of numerical values described in the present disclosure, the upper limit or the lower limit described in a certain range of numerical values may be substituted with the values described in Examples.

In the present disclosure, a combination of two or more preferred aspects is a more preferred aspect.

In the present disclosure, in a case where there is a plurality of kinds of substances that correspond to each component, unless otherwise specified, the amount of each component means the total amount of the plurality of kinds of substances.

In the present disclosure, the term "step" includes not only an independent step but also a step which is not apparently distinguishable from other steps as long as the intended object thereof is achieved.

[Magnetic Recording Medium]

The magnetic recording medium of the present disclosure contains ε-type iron oxide particles. A coefficient of variation of an aspect ratio of the ε-type iron oxide particles is equal to or smaller than 18%, and a squareness ratio of the magnetic recording medium measured in a longitudinal direction thereof is higher than 0.3 and equal to or lower than 0.5.

As described above, although ε-iron oxide particles are nanosized fine particles, they express extremely high coercivity. Therefore, the ε-iron oxide particles are drawing attention as a magnetic material. However, unfortunately, in a magnetic recording medium in which the ε-iron oxide particles are used as a magnetic material, because the distribution of the values of magnetic field (SFD) is wide in a case where magnetization reversal occurs, noise increases, and hence SNR is reduced.

It is preferable that an ideal squareness ratio (Mr/Ms) measured in the longitudinal direction of the magnetic recording medium is close to 0. Generally, it is said that a squareness ratio higher than 0.3 shows that the alignment state of magnetic powder in a vertical direction deteriorates for a non-magnetic support, and it is apprehended that the deterioration of the alignment state of the magnetic powder may lead to the deterioration of SNR.

The inventors of the present invention paid attention to the aspect ratio of the ε-iron oxide particles and conducted examinations. As a result, the inventors have found that in a case where the coefficient of variation of the aspect ratio is equal to or smaller than 18%, in a range in which the squareness ratio is higher than 0.3, more specifically, in a range in which the squareness ratio measured in the longitudinal direction is higher than 0.3 and equal to or lower than 0.5, excellent SNR is accomplished. This is new knowledge.

The reason why SNR is improved in a case where the squareness ratio in the longitudinal direction is within a range of higher than 0.3 and equal to or lower than 0.5 is unclear, but is assumed to be as below.

Conventionally, an excellent squareness ratio in the longitudinal direction is regarded as being equal to or lower than 0.3. However, the inventors consider that in a case where the squareness ratio is slightly high, that is, in a case where the ε-iron oxide particles slightly incline further to the longitudinal direction compared to the conventional ε-iron oxide particles, in other words, in a case where the squareness ratio is higher than 0.3, magnetization reversal may more easily occur at the time of applying a recording magnetic field to the ε-iron oxide particles from a recording head, and hence SNR may be improved.

Furthermore, the ε-iron oxide particles tend to more easily cause magnetization reversal only in a case where the coefficient of variation of the aspect ratio of the ε-iron oxide particles is reduced and becomes equal to or smaller than 18%. The reason is assumed to be as below. In a case where the coefficient of variation of the aspect ratio is small, that is, in a case where the aspect ratios of the magnetic particles are more uniform, the effect of slanting the alignment direction may be more markedly exerted, and hece the aforementioned trend may be observed.

The above description is one of the operation mechanisms that are currently assumed, and the present disclosure is not limited to the assumptive mechanism.

<ε-Type Iron Oxide Particles: ε-Iron Oxide Particles>

The magnetic recording medium of the present disclosure contains ε-iron oxide particles as magnetic particles. Whether a magnetic particle is an iron oxide-based compound having an ε-type crystal structure can be checked, for example, by an X-Ray-Diffraction (XRD) method.

Furthermore, the composition of an ε-iron oxide-based compound constituting an ε-iron oxide particle can be checked by a high-frequency Inductively Coupled Plasma (ICP) emission spectrometry.

(Coefficient of Variation of Aspect Ratio of ε-Iron Oxide Particles)

The coefficient of variation of the aspect ratio of the ε-iron oxide particles (hereinafter, referred to as "coefficient of variation" in some cases) is equal to or smaller than 18%, preferably equal to or smaller than 15%, and more preferably equal to or smaller than 13%.

In the present disclosure, the aspect ratio of the ε-iron oxide particles means a ratio (that is, an aspect ratio) of a number-average major axis length (so-called average major axis length) of 500 primary particles of the ε-iron oxide particles to a number-average minor axis length (so-called average minor axis length) of 500 primary particles of the ε-iron oxide particles.

Specifically, the average major axis length and the average aspect ratio of the powder of the ε-iron oxide particles are determined by the following method.

By using a Transmission Electron Microscope (TEM), the ε-iron oxide particles are imaged at 80,000× magnification and printed on printing paper at a total magnification of 500,000×. From each of the printed particles, primary particles are selected, and the contour of the primary particles is traced using a digitizer. The primary particles mean independent particles not being aggregated. By using image analysis software, the major axis length and the minor axis length in the traced contour are determined.

For 500 particles randomly extracted from the primary particles printed on several sheets of printing paper, the major axis length and the minor axis length are determined. For each of the determined major axis lengths and the minor axis lengths of the 500 particles, a simple average (that is, a number average) is calculated, thereby determining the average major axis length and the average aspect ratio (average major axis length/average minor axis length).

As the transmission electron microscope, for example, a transmission electron microscope (model No.: H-9000) from Hitachi High-Technologies Corporation can be suitably used, but the transmission electron microscope is not limited to this.

As the image analysis software, for example, image analysis software (trade name: KS-400) manufactured by CARL ZEISS, Image J which is free software, and the like can be suitably used, but the image analysis software is not limited to this.

The coefficient of variation of the aspect ratio was calculated from the average aspect ratio of the particles (average of the aspect ratio) determined as above, by [(standard deviation of aspect ratio)/(average of aspect ratio)]×100.

The coefficient of variation of the aspect ratio can be adjusted, for example, by controlling the manufacturing condition of the ε-iron oxide particles, particularly, the reaction temperature condition, using an appropriate surface modifier at the time of manufacturing the ε-iron oxide particles, and the like.

As long as the coefficient of variation of the aspect ratio is within the above range, the shape of each of the ε-iron oxide particles is not particularly limited.

For example, the ε-iron oxide particles have a spherical shape, a rod shape, a needle shape, and the like.

Among these, as the shape of the ε-iron oxide particles, a spherical shape is preferable. The specific surface area of the spherical shape can be reduced further compared to other shapes. Therefore, from the viewpoint of dispersion and alignment of magnetic particles, the spherical shape is preferable.

The aspect ratio of the ε-iron oxide particles is preferably within a range of 1.00 to 1.35, more preferably within a range of 1.00 to 1.30, and even more preferably within a range of 1.00 to 1.25, because then the particles are close to spheres.

In a case where the aspect ratio of the ε-iron oxide particles is within the above range, the dispersibility of the ε-iron oxide particles in the magnetic layer of the magnetic recording medium and the alignment properties of magnetic particles in the magnetic layer are further improved.

It is preferable that the ε-iron oxide particles have a spherical shape. However, the powder is affected by the raw materials, the manufacturing method, and the like. Therefore, not all the particles have a spherical shape, and some of the particles are present as cylindrical particles, amorphous particles, and the like in some cases. Therefore, in the present disclosure, as the particle size of the ε-iron oxide particles, the average equivalent circular diameter of the particles is adopted.

The average equivalent circular diameter of the ε-iron oxide particles used in the magnetic recording medium of the present disclosure is, for example, preferably 7 nm to 35 nm, more preferably 8 nm to 25 nm, and even more preferably 8 nm to 15 nm.

In a case where the average equivalent circular diameter of the ε-iron oxide particles is equal to or greater than 7 nm, the handleability thereof is further improved. In addition, the crystal structure of the ε-iron oxide is more stabilized, and the distribution of magnetic characteristics is further narrowed.

In a case where the average equivalent circular diameter of the ε-iron oxide particles is equal to or smaller than 35 nm, the recording density can be further improved. In addition, because the particles are easily adjusted to have magnetic characteristics suited for recording and reproduction, a magnetic recording medium having further improved SNR can be realized.

In the present disclosure, "average equivalent circular diameter of the ε-iron oxide particles" means the average of equivalent circular diameters of 500 primary particles of the ε-iron oxide particles.

The equivalent circular diameter of each of the ε-iron oxide particles is determined based on an image captured using a Transmission Electron Microscope (TEM). Specifically, the diameter of a circle having the same area as the area (that is, the projected area) of each of the ε-iron oxide particles in the TEM image is adopted as an equivalent circular diameter, and a simple average thereof is calculated and adopetd as the average equivalent circular diameter.

Specific examples of the method for measuring the average equivalent circular diameter of the ε-iron oxide particles will be shown in Examples which will be described later.

The ε-iron oxide particles used in the magnetic recording medium of the present disclosure can adopt various aspects.

Examples of the ε-iron oxide particles according to the present disclosure include particles of an ε-iron oxide-based compound represented by the following Formula (1-1).

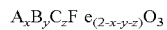   Formula (1-1)

In Formula (1-1), A represents at least one kind of trivalent metallic element selected from the group consisting of Ga, Al, In, and Rh. B represents at least one kind of divalent metallic element selected from the group consisting of Co, Ni, Mn, and Zn. C represents at least one kind of tetravalent metallic element selected from Ti and Sn.

x satisfies 0<x<1. y satisfies 0<y<1. z satisfies 0<z<1. x+y+z is smaller than 2.

The ε-iron oxide particles in the present disclosure may contain, in addition to the ε phase, a different crystal phase such as an α phase or a γ phase in a portion of the particles within a range that does not impair the effect thereof.

Whether the ε-iron oxide particles obtained by the manufacturing method of ε-iron oxide particles of the present disclosure is an iron oxide-based compound having an ε-type crystal structure can be checked, for example, by an X-ray diffraction (XRD) method.

The composition of the ε-iron oxide particles can be checked by a high-frequency Inductively Coupled Plasma (ICP) emission spectrometry.

Specifically, a container filled with 12 mg of sample powder and 10 mL of a 4 mol/L (liter, the same shall be applied hereinafter) aqueous hydrochloric acid solution is kept for 3 hours on a hot plate with a set temperature of 80° C., thereby obtaining a solution. Then, the obtained solution is filtered using a 0.1 μm membrane filter. For the obtained filtrate, elemental analysis is performed using a high-frequency Inductively Coupled Plasma (ICP) emission spectrometer. Based on the obtained elemental analysis results, a content rate of each of the metal atoms with respect to 100 at % of iron atoms is determined. Based on the obtained content rate, the composition is checked.

As a measurement apparatus, for example, ICPS-8100 (trade name) from Shimadzu Corporation can be suitably used, but the measurement apparatus is not limited to this.

As the manufacturing method of ε-iron oxide particles having a coefficient of variation of an aspect ratio equal to or smaller than 18%, for example, a manufacturing method of ε-iron oxide particles of the present disclosure that will be described later is suitable.

The equivalent circular diameter of the ε-iron oxide particles can be increased by raising the firing temperature at the time of preparing the ε-iron oxide particles and decreased by lowering the firing temperature.

(Squareness Ratio Measured in Longitudinal Direction of Magnetic Recording Medium)

The squareness ratio measured in the longitudinal direction of the magnetic recording medium of the present disclosure (hereinafter, referred to as "SQ in the longitudinal direction" as well) is higher than 0.3 and equal to or lower than 0.5, preferably 0.33 to 0.45, and more preferably 0.35 to 0.40.

The squareness ratio (SQ) measured in the longitudinal direction of the magnetic recording medium can be measured by the following method.

First, as the magnetic recording medium which is a measurement sample, for example, a magnetic tape is prepared.

For instance, in a case where a magnetic tape is prepared as the magnetic recording medium, the magnetic tape as a measurement sample is installed in an environment with an atmospheric temperature of 23° C. such that the longitudinal direction of the magnetic tape becomes parallel with a magnetic field application direction. By sweeping the magnetic field in a range of applied magnetic field±1,194 kA/m (15 kOe), the magnetization intensity of the magnetic tape in the longitudinal direction thereof with respect to the applied magnetic field is measured.

The magnetic field sweep speed is set to be 6.7 kA/m/s (second) [84 Oe/s (second)].

SQ is represented by Mr/Ms by using a magnetization intensity Ms (saturation magnetization) at an applied magnetic field of 1,194 kA/m and a magnetization intensity Mr (residual magnetization) at an applied magnetic field of 0 kA/m.

In a case where a magnetic tape is prepared as the magnetic recording medium, the transport direction of the magnetic tape may be regarded as the longitudinal direction. In a case where a magnetic disk is prepared as the magnetic recording medium, the measurement sample is cut, and one side thereof is regarded as the longitudinal direction.

In the magnetic recording medium of the present disclosure, the coefficient of variation of the aspect ratio of the ε-iron oxide particles contained in the magnetic layer is controlled to be equal to or smaller than 18%. Accordingly, in the range of SQ higher than 0.3 and equal to or lower than 0.5 that is measured in the longitudinal direction of the magnetic recording medium, excellent SNR is realized.

SQ in the longitudinal direction can be adjusted by controlling the manufacturing condition of the ε-iron oxide particles, particularly, controlling the alignment state of the ε-iron oxide particles at the time of forming the magnetic layer by setting the content rate of a high-boiling-point solvent, which has a boiling point equal to or higher than 150° C., in organic solvents used at the time of reaction to be in a suitable range, controlling the temperature of dry air used at the time of drying the magnetic layer after coating, the amount of the dry air, the coating speed for the magnetic layer, the time taken for the magnetic layer to dry after alignment, the direction of a magnetic field applied from an alignment magnet, and the like.

[Manufacturing Method of ε-Type Iron Oxide Particles]

There is no particular limitation on the manufacturing method of the ε-iron oxide particles which are suitably used in the magnetic recording medium of the present disclosure described above and have a coefficient of variation of an aspect ratio equal to or smaller than 18%.

The manufacturing method of ε-iron oxide particles of the present disclosure is preferable because this method makes it possible to easily manufacture ε-iron oxide particles having a coefficient of variation of an aspect ratio equal to or smaller than 18%.

The manufacturing method of ε-iron oxide particles includes a step A of mixing together water, a compound containing trivalent iron ions, and at least one kind of metal compound containing a metallic element other than iron so as to prepare a mixed solution containing iron ions, a step B of adding an alkali agent to the mixed solution obtained by the step A while stirring the mixed solution and stirring the mixed solution while keeping the mixed solution at a temperature equal to or higher than 0° C. and equal to or lower than 25° C., a step C of heating the mixed solution obtained by the step B and stirring the mixed solution while keeping the mixed solution at a liquid temperature higher than 30° C. and equal to or lower than 90° C., and a step D of extracting powder from the mixed solution obtained by the step C and performing a heat treatment on the obtained powder so as to obtain heat-treated powder, in which a coefficient of variation of an aspect ratio of the ε-type iron oxide particles is equal to or smaller than 18%.

<Step A>

In the step A, by mixing together water, a compound containing trivalent iron ions, and at least one kind of metal compound containing a metallic element other than iron, a mixed solution containing iron ions is prepared.

The compound containing trivalent iron ions as an iron raw material used in the step A and the metal compound containing a metallic element other than iron can be used without particular limitation as long as the compounds are materials that are generally used for preparing ε-iron oxide particles.

Examples of materials used for preparing the ε-iron oxide particles include ε-iron oxide represented by Formula (1-1).

$$A_xB_yC_zFe_{(2-x-y-z)}O_3 \quad \text{Formula (1-1)}$$

For example, in a case where particles of the ε-iron oxide represented by Formula (1-1) are manufactured, A in Formula (1-1) represents at least one kind of trivalent metallic element selected from the group consisting of Ga, Al, In, and Rh. B represents at least one kind of divalent metallic element selected from the group consisting of Co, Ni, Mn, and Zn. C represents at least one kind of tetravalent metallic element selected from Ti and Sn.

x satisfies 0<x<1. y satisfies 0<y<1. z satisfies 0<z<1. x+y+z is smaller than 2.

From the viewpoint of stabilizing the ε-phase and the magnetic characteristics, A is preferably a metallic element selected from Ga and Al, B is preferably a metallic element selected from Co and Mn, and C is preferably Ti.

Regarding x, y, and z in Formula (1-1), from the viewpoint of obtaining preferred magnetic characteristics applied to the magnetic recording medium, x preferably satisfies 0<x<0.7, y preferably satisfies 0<y<0.4, and z preferably satisfies 0<z<0.4. x more preferably satisfies 0.05<x<0.4, y more preferably satisfies 0.01<y<0.2, and z more preferably satisfies 0.01<z<0.2.

Specifically, examples of the particles of the ε-iron oxide represented by Formula (1-1) include ε-$Ga_{0.24}Co_{0.05}Ti_{0.05}Fe_{1.66}O_3$, ε-$Al_{(0.20)}Co_{(0.06)}Ti_{(0.06)}Fe_{(1.68)}O_3$, ε-$Ga_{(0.15)}Mn_{(0.05)}Ti_{(0.05)}Fe_{(1.75)}O_3$, and the like.

Typically, as the step A, for example, a trivalent iron compound such as iron nitrate and an metallic element other than iron such as a metal compound including aluminum, titanium, or the like that is used according to the purpose are dissolved in water and thoroughly stirred and mixed together, thereby preparing a mixed solution.

<Step B>

The step B is a step of adding an alkali agent to the mixed solution obtained by the step A while stirring the mixed solution and stirring the mixed solution while keeping the mixed solution at a temperature higher than 0° C. and equal to or lower than 25° C. such that a reaction occurs.

In the step B, at the time of adding the alkali agent to the mixed solution and causing a reaction, the mixed solution is kept at a temperature higher than 0° C. and equal to or lower than 25° C., that is, at a temperature equal to or lower than room temperature, and the reaction is caused to proceed under the above temperature condition. In a case where a precursor of the ε-iron oxide is synthesized from another iron oxide, by treating the mixed solution containing the iron oxide as a raw material at a low temperature equal to or lower than room temperature from the first, uniform particles having a small particle diameter are precipitated first.

In the step B, the temperature of the mixed solution is higher than 0° C. and equal to or lower than 25° C., preferably within a range of 1° C. to 20° C., and more preferably within a range of 5° C. to 15° C.

The reaction time is not particularly limited. However, from the viewpoint of more efficiently precipitating uniform particles having a small particle diameter, the reaction time is preferably equal to or longer than 1 hour, more preferably 1 hour to 3 hours, and even more preferably 1.5 hours to 2.5 hours.

In a case where the temperature is kept within the above range, and the reaction is caused to thoroughly proceed for the above reaction time, it is possible to more efficiently obtain fine and uniform particles that can be nuclei of the ε-iron oxide particles.

<Step C>

The step C is a step of heating the mixed solution containing the fine and uniform ε-iron oxide particles obtained by causing a reaction in the step B at a low temperature, and stirring the mixed solution while keeping the mixed solution at a liquid temperature higher than 30° C. and equal to or lower than 90° C.

Fine and uniform particles are generated by the step B, and then the reaction is continued by means of heating. In this way, the particles grow (are aggregated) uniformly, and consequently, particles having a uniform aspect ratio in which a coefficient of variation of the aspect ratio is equal to or smaller than 18% are easily generated.

In a case where particles are synthesized at room temperature or at a temperature higher than room temperature by the reaction step precedent to the step C from the first, fine and uniform particles are not easily generated. Furthermore, presumably, for example, rod-like magnetic particles and fine sediment-like magnetic particles may be generated, and even though the reaction is continued thereafter, the fine sediment-like particles may remain without being aggregated with the rod-like particles, and hence the coefficient of variation of the aspect ratio of the obtained magnetic particles may not become equal to or smaller than 18%.

The temperature of the mixed solution after heating in the step C is higher than 30° C. and equal to or lower than 90° C., preferably 40° C. to 85° C., and more preferably 50° C. to 80° C.

The reaction time is not particularly limited. From the viewpoint of more effectively accomplish a size and a coefficient of variation of an aspect ratio that are preferred for magnetic particles, the reaction time in the step C is preferably equal to or longer than 4 hours, more preferably 4 hours to 10 hours, and even more preferably 5 hours to 9 hours.

In a case where the reaction temperature is higher than 30° C., the ε-iron oxide particles more efficiently grow. In a case where the reaction temperature is equal to or lower than 90° C., it is possible to obtain an advantage of being able to inhibit rapid growth of the particles.

In a case where the reaction is allowed to thoroughly proceed in the above temperature range for the above reaction time, fine and uniform particles that can be nuclei of ε-iron oxide particles grow, and hence magnetic particles having uniform aspect ratio in which a coefficient of variation of the aspect ratio is equal to or smaller than 18% are obtained.

<Step D>

In the step D, the powder generated by the step C is extracted from the mixed solution, and a heat treatment is performed on the obtained powder so as to obtain heat-treated powder.

There is no particular limitation on the method for extracting the powder from the mixed solution. For example, from the viewpoint of the simplicity of operation, as the method for extracting the powder, a centrifugation method is preferable.

There is no particular limitation on the centrifugation condition. For example, the centrifugation can be performed at 1,000 rpm (revolutions per minute; the same shall be applied hereinafter) to 10,000 rpm for 1 minute to 60 minutes.

The extracted powder may be subjected to a drying step before the heat treatment.

The drying method is not particularly limited, and examples thereof include a method of using a drying machine (for example, an oven).

The powder is then subjected to a heat treatment (so-called firing), thereby obtaining heat-treated powder. By being subjected to the heat treatment, the powder obtains magnetism.

The atmosphere of the heat treatment is not particularly limited. The heat treatment may be performed in the air atmosphere, that is, in an environment under normal pressure in the presence of air.

The heat treatment temperature (so-called firing temperature) is preferably equal to or higher than 800° C. and equal to or lower than 1,400° C. The heat treatment temperature is preferably within a range of 850° C. to 1,200° C., and more preferably within a range of 900° C. to 1,150° C.

The heat treatment time is not particularly limited, and can be set to be 0.5 hours to 20 hours for example.

The manufacturing method of ε-iron oxide particles of the present disclosure may further include other steps in addition to the step A to step D described above.

Examples of those other optional steps include a step of mixing together the heat-treated powder and an aqueous alkali solution such that the powder is treated with an alkali.

In a case where the heat-treated powder is mixed with the aqueous alkali solution such that the heat-treated powder is treated with an alkali, impurities remaining on each of the particles of the heat-treated powder are removed.

The aqueous alkali solution is not particularly limited. For example, an aqueous solution of a strong alkali such as an aqueous sodium hydroxide (NaOH) solution or an aqueous potassium hydroxide (KOH) solution is preferable.

As water which is a solvent of the aqueous alkali solution, pure water, deionized water, and the like are preferable.

The liquid temperature of the aqueous alkali solution at the time of mixing with the heat-treated powder is not particularly limited, and can be set to be equal to or higher than 70° C. for example. Because water is used as a solvent, the liquid temperature of the aqueous alkali solution is preferably less than 100° C.

The concentration of the aqueous alkali solution is not particularly limited, and can be set to be equal to or higher than 4 mol/L for example.

The amount of the aqueous alkali solution used is not particularly limited. For example, the amount of the aqueous alkali solution used is preferably 400% to 20,000% of the mass of the heat-treated powder, and more preferably 1,000% to 10,000% of the mass of the heat-treated powder.

At the time of treating the heat-treated powder with an alkali, the heat-treated powder and the aqueous alkali solution may be simply mixed together.

The entirety of the heat-treated powder and the entirety of the aqueous alkali solution may be mixed together at once. Alternatively, the heat-treated powder and the aqueous alkali solution may be slowly mixed together bit by bit. Furthermore, the heat-treated powder and the aqueous alkali solution may be mixed together by adding either of the heat-treated powder or the aqueous alkali solution to the other bit by bit.

For example, from the viewpoint of the uniformity of the reaction, it is preferable to mix the heat-treated powder with the aqueous alkali solution by adding the heat-treated powder bit by bit to the aqueous alkali solution.

The method for mixing together the heat-treated powder and the aqueous alkali solution is not particularly limited, and examples thereof include a mixing method by stirring.

The stirring means is not particularly limited. Generally, a stirring tool or a stirring device can be used.

The stirring time is not particularly limited, and can be set to be 3 hours to 36 hours for example.

After the alkali treatment, from the aqueous alkali solution, a group of particles from which the impurities have been removed (that is, the ε-iron oxide particles) is extracted.

The method for extracting the ε-iron oxide particles is not particularly limited. For example, from the viewpoint of the simplicity of operation, a centrifugation method is preferable.

The powder having undergone the alkali treatment step can be subjected to a step of removing the alkali agent by performing a washing treatment on the powder.

For washing, water or an aqueous solution containing a water-soluble polymer may be used.

In a case where the aqueous solution containing a water-soluble polymer is used, the dispersibility of the ε-iron oxide particles in the aqueous solution tends to be improved. Furthermore, in a case where the surface of each of the ε-iron oxide particles is treated with the water-soluble polymer, due to the solid-liquid separation following the treatment, undesirable fine particles tend to be more efficiently removed.

As the water used for washing and the water which is a solvent of the aqueous solution containing a water-soluble polymer, pure water, deionized water, and the like are preferable.

Examples of the water-soluble polymer include polyvinyl alcohol (PVA), hydroxymethyl cellulose (HMC), hydroxyethyl cellulose (HEC), polyvinyl pyrrolidone (PVP), and the like.

The solid-liquid separation method is not particularly limited. For example, from the viewpoint of the simplicity of operation, a centrifugation method is preferable.

The centrifugation condition is not particularly limited. For example, the centrifugation can be performed for 1 minute to 60 minutes at 1,000 rpm to 10,000 rpm.

The method for drying the washed ε-iron oxide particles is not particularly limited, and examples thereof include a method of using a drying machine (for example, an oven) with an internal atmospheric temperature of 60° C. to 110° C.

According to the manufacturing method of the present disclosure, it is possible to simply obtain ε-iron oxide particles having a uniform aspect ratio in which a coefficient of variation of the aspect ratio is equal to or smaller than 18%.

[Manufacturing Method of Magnetic Recording Medium]

The manufacturing method of a magnetic recording medium of the present disclosure is a method for manufacturing a magnetic recording medium using the ε-iron oxide particles which are obtained by the manufacturing method of ε-iron oxide particles of the present disclosure described above and has a coefficient of variation of an aspect ratio equal to or smaller than 18%.

The manufacturing method of a magnetic recording medium of the present disclosure includes a step E of preparing a composition for forming a magnetic layer containing ε-type iron oxide particles, which are obtained by the manufacturing method of ε-iron oxide particles of the present disclosure described above, and organic solvents, a step F of applying the composition for forming a magnetic layer onto a non-magnetic support so as to form a layer of the composition for forming a magnetic layer, a step G of performing a magnetic field alignment treatment on the formed layer of the composition for forming a magnetic layer, and a step H of drying the layer of the composition for forming a magnetic layer having undergone the magnetic field alignment treatment so as to form a magnetic layer, in which a content rate of an organic solvent having a boiling point equal to or higher than 150° C. in all the organic solvents used for preparing the composition for forming a magnetic layer in the step E is 5% by mass to 40% by mass.

<Step E>

In the step E, a composition for forming a magnetic layer containing ε-type iron oxide particles, which are obtained by the manufacturing method of ε-iron oxide particles of the present disclosure described above, and organic solvents.

Details of how to obtain the ε-iron oxide particles having a coefficient of variation of an aspect ratio equal to or smaller than 18% by the manufacturing method of ε-iron oxide particles of the present disclosure are as described above. Therefore, the details will not be described herein.

The step E can include a step E-1 of mixing together the ε-iron oxide particles, a binder, and, if necessary, at least one kind of component selected from the group consisting of an abrasive, various additives (for example, other additives which will be described later) so as to obtain a mixed solution, and a step E-2 of dispersing the mixed solution obtained by the step E-1.

All the raw materials such as the ε-iron oxide particles, the binder, and the abrasive may be mixed together at any point in time during the step E.

In the step E, the raw materials may be mixed together at once or mixed together by being divided into two or more portions.

For example, the binder may be mixed with other raw materials in the step E-2 and then further added to and mixed with the raw materials so as to adjust viscosity after dispersion.

For dispersing the raw materials of the composition for forming a magnetic layer, it is possible to use known dispersion apparatuses such as a batch-type vertical sand mill and a horizontal beads mill.

As dispersion beads, it is possible to use glass beads, zirconia beads, titania beads, steel beads, and the like. The particle diameter (so-called bead size) and the filling rate of the dispersion beads to be used can be appropriately optimized.

For dispersing the raw materials of the composition for forming a magnetic layer, for example, known ultrasonic apparatuses can be used.

Furthermore, before the step E-2, at least a portion of the raw materials of the composition for forming a magnetic layer may be kneaded using, for example, an open kneader.

The raw materials of the composition for forming a magnetic layer may be mixed together after each of the raw materials is prepared in the form of a solution. For example, it is possible to prepare a magnetic solution containing the ε-iron oxide particles and an abrasive solution containing the abrasive, then to mix the solutions together, and to disperse the raw materials.

(Composition for Forming Magnetic Layer)

"ε-Iron oxide particles" for preparing the composition for forming a magnetic layer has the same definition as the ε-Iron oxide particles described in the section of "ε-Iron oxide particles" that has a coefficient of variation of an aspect ratio equal to or smaller than 18%, and preferred aspects thereof are also the same. Therefore, the particles will not be described herein.

The content rate of the ε-iron oxide particles in the composition for forming a magnetic layer with respect to the total mass of the composition for forming a magnetic layer is preferably equal to or higher than 5% by mass and equal to or lower than 30% by mass, and more preferably equal to or higher than 8% by mass and equal to or lower than 20% by mass.

(Binder)

It is preferable that the composition for forming a magnetic layer contains a binder.

Examples of the binder include various resins.

The resin used as the binder is not particularly limited as long as the resin can form a layer satisfying intended physical characteristics such as hardness and durability.

The resin used as the binder may be a homopolymer or a copolymer. Furthermore, the resin may be a known electron beam-curable type resin.

Examples of the resin used as the binder include polyurethane, a polyester-based resin, a polyamide-based resin, a vinyl chloride-based resin, styrene, acrylonitrile, an acrylic resin obtained by copolymerizing methyl methacrylate and the like, a cellulose resin such as nitrocellulose, an epoxy resin, a phenoxy resin, a polyvinyl alkyral resin such as polyvinyl acetal or polyvinyl butyral, and the like.

Among these, as the resin used as the binder, at least one kind of resin selected from the group consisting of polyurethane, an acrylic resin, a cellulose-based resin, and a vinyl chloride-based resin is preferable.

For example, from the viewpoint of further improving the dispersibility of the ε-iron oxide particles, it is preferable that the resin used as the binder has a functional group (for example, a polar group), which is adsorbed onto the surface of each of the ε-iron oxide particles, within a molecule.

As the functional group, for example, $—SO_3M$, $—SO_4M$, $—PO(OM)_2$, $—OPO(OM)_2$, $—COOM$, $=NSO_3M$, $—NRSO_3M$, $—NR^1R^2$, $—N^+R^1R^2R^3X^-$, and the like are preferable.

M represents a hydrogen atom or an alkali metal atom such as Na or K. R represents an alkylene group. $R^1$, $R^2$, and $R^3$ each independently represent a hydrogen atom, an alkyl group, or a hydroxyalkyl group. X represents a halogen atom such as Cl or Br.

In a case where the resin used as the binder has the aforementioned functional group, the content of the functional group in the resin is preferably 0.01 meq/g to 2.0 meq/g, and more preferably 0.3 meq/g to 1.2 meq/g.

In a case where the content of the functional group in the resin is within the above range, the dispersibility of the ε-iron oxide particles in the magnetic layer is further improved, and magnetic density can be further improved.

As the resin used as the binder, polyurethane having $—SO_3Na$ (hereinafter, referred to as "$SO_3Na$ group" as well) is more preferable. In a case where polyurethane having a $SO_3Na$ group is used as the binder, the amount of the $SO_3Na$ group contained in the polyurethane is preferably within a range of 0.01 meq/g to 1.0 meq/g.

The molecular weight of the resin used as the binder that is expressed as a weight-average molecular weight can be set to be 10,000 to 200,000 for example.

In the present disclosure, the weight-average molecular weight is a value determined by expressing a value measured by gel permeation chromatography (GPC) in terms of polystyrene. The measurement conditions are as below, for example.

—Conditions—
GPC apparatus: HLC-8120 (Tosoh Corporation)
Column: TSK gel Multipore HXL-M (Tosoh Corporation, 7.8 mmID (Inner Diameter)×30.0 cm)
Eluent: tetrahydrofuran (THF)
Sample concentration: 0.5% by mass
Amount of sample injected: 10 μL
Flow rate: 0.6 mL/min
Measurement temperature: 40° C.
Detector: RI detector In a case where the composition for forming a magnetic layer contains the binder, the composition contains only one kind of binder or two or more kinds of binders.

In a case where the composition for forming a magnetic layer contains the binder, the content of the binder in the composition for forming a magnetic layer is not particularly limited. For example, the content of the binder with respect to 100 parts by mass of the ε-iron oxide particles is preferably equal to or greater than 5 parts by mass and equal to or smaller than 50 parts by mass, and more preferably equal to or greater than 10 parts by mass and equal to or smaller than 30 parts by mass.

In a case where the content of the binder in the composition for forming a magnetic layer is within the above range with respect to 100 parts by mass of the ε-iron oxide particles, the dispersibility of the ε-iron oxide particles in the magnetic layer is further improved, and magnetic density can be further improved.

(Abrasive)

The composition for forming a magnetic layer can contain an abrasive.

The abrasive can contribute to the reduction of tape damage such as abrasion or scratching that can occur while a magnetic recording medium is running, and the removal of attachments (so-called debris) that adhere to a head while a magnetic recording medium is being used.

Examples of the abrasive mainly include particles of known materials with Mohs hardness equal to or higher than 6, such as α-alumina, β-alumina, silicon carbide, chromium oxide, cerium oxide, α-iron oxide, corundum, artificial diamond, silicon nitride, silicon carbide, titanium carbide, titanium oxide, silicon dioxide, and boron nitride.

As the abrasive, a complex of the abrasives described above (for example, an abrasive whose surface is treated with another abrasive) may be used. Although this type of abrasive contains a compound or element other than main components in some cases, as long as the proportion of the main components is equal to or higher than 90% by mass, the effect of the abrasive does not change.

The shape of the abrasive is not particularly limited. For example, the abrasive has the shape of a needle-like particle, a spherical particle, a cubical particle, a rectangular particle, and the like.

For example, from the viewpoint of further improving abrasive properties, among these, abrasives with the shape of a particle partially having a corner, such as a needle-like particle and a cubical particle, are preferable.

The average equivalent circular diameter of a powder of the abrasive is not particularly limited. For example, from the viewpoint of more appropriately maintaining the abrasive properties of the abrasive, the average equivalent circular diameter is preferably 0.01 μm to 2.0 μm, more preferably 0.05 μm to 1.0 μm, and even more preferably 0.05 μm to 0.5 μm.

In a case where a plurality of kinds of abrasives having different particle diameters are used in combination, the durability of the magnetic layer can be improved. Furthermore, in a case where the particle size distribution of the powder of the abrasive is narrowed, the electromagnetic conversion characteristics of a magnetic recording medium can be improved.

In the present disclosure, the average equivalent circular diameter of the powder of the abrasive is measured by the same method as that used for measuring the average equivalent circular diameter of the ε-iron oxide particles described above.

The BET specific surface area of the abrasive is preferably 1 m$^2$/g to 30 m$^2$/g.

The tap density of the abrasive is preferably 0.3 g/mL to 2 g/mL.

In a case where the composition for forming a magnetic layer contains the abrasive, the composition may contain only one kind of abrasive or two or more kinds of abrasives.

As the abrasive, commercial products can be used.

Examples of the commercial products include AKP-12, AKP-15, AKP-20, AKP-30, AKP-50, HIT20, HIT-30, HIT-55, HIT60A, HIT70, HIT80, and HIT100 from Sumitomo Chemical Co., Ltd., ERC-DBM, HP-DBM, and HPS-DBM from Reynolds Metals Company, WA10000 from Fujimi Incorporated., UB20 from Uemura & CO., LTD., G-5, KROMEX U2, and KROMEX U1 from Nippon Chemical Industrial CO., LTD., TF100 and TF140 manufactured by TODAKOGYO CORP, BETA RANDOM ULTRAFINE from IBIDEN, B-3 from SHOWA KDE CO., LTD., and the like (all of the above are trade names).

In a case where the composition for forming a magnetic layer contains the abrasive, the content of the abrasive in the composition for forming a magnetic layer is not particularly limited. For example, the content of the abrasive with respect to 100 parts by mass of the ε-iron oxide particles is preferably 0.1 parts by mass to 20 parts by mass, and more preferably 0.5 parts by mass to 15 parts by mass.

In a case where the content of the abrasive in the composition for forming a magnetic layer is equal to or greater than 0.1 parts by mass with respect to 100 parts by mass of the ε-iron oxide particles, the abrasion resistance of the formed magnetic layer can be further improved.

In a case where the content of the abrasive in the composition for forming a magnetic layer is equal to or smaller than 20 parts by mass with respect to 100 parts by mass of the ε-iron oxide particles, the influence thereof exerted on the content of the ε-iron oxide particles is small. Accordingly, a magnetic recording medium with better SNR can be realized.

(Other Additives)

If necessary, the composition for forming a magnetic layer may contain various additives (so-called other additives) in addition to the ε-iron oxide particles, the binder, and the abrasive, within a range that does not deteriorate the effects.

Examples of those other additives include a non-magnetic filler, a lubricant, a dispersant, a curing agent, a dispersion aid, a fungicide, an antistatic agent, an antioxidant, and the like.

Each of those other additives may perform two or more functions.

—Non-Magnetic Filler—

The magnetic layer can contain a non-magnetic filler.

The non-magnetic filler can contribute to the adjustment of physical properties of the magnetic layer such as film hardness and surface roughness.

In the present disclosure, "non-magnetic filler" means a filler satisfying at least one of the remanent flux density equal to or lower than 10 mT or coercivity equal to or lower than 7.98 kA/m (100 Oe).

Examples of the non-magnetic filler include carbon black, inorganic particles, and the like.

For example, from the viewpoint of the dispersion stability and the uniform alignment in the magnetic layer, as the non-magnetic filler, colloidal particles are preferable.

Furthermore, for example, from the viewpoint of ease of availability, as the non-magnetic filler, at least one kind of filler selected from the group consisting of carbon black and inorganic colloidal particles is preferable, and at least one kind of filler selected from the group consisting of carbon black and inorganic oxide colloidal particles is more preferable.

Examples of the inorganic oxide colloidal particles include colloidal particles of inorganic oxides such as $\alpha$-alumina with an $\alpha$ transformation rate equal to or higher than 90%, $\beta$-alumina, $\gamma$-alumina, $\theta$-alumina, silicon dioxide, silicon carbide, chromium oxide, cerium oxide, $\alpha$-iron oxide, goethite, corundum, silicon nitride, titanium carbide, titanium dioxide, tin oxide, magnesium oxide, tungsten oxide, zirconium oxide, boron nitride, zinc oxide, calcium carbonate, calcium sulfate, barium sulfate, and molybdenum disulfide and colloidal particles of composite inorganic oxides such as $SiO_2/Al_2O_3$, $SiO_2/B_2O_3$, $TiO_2/CeO_2$, $SnO_2/Sb_2O_3$, $SiO_2/Al_2O_3/TiO_2$, and $TiO_2/CeO_2/SiO_2$.

From the viewpoint of ease of availability of monodispersed colloidal particles, as the inorganic oxide colloidal particles, silica colloidal particles (so-called colloidal silica) are particularly preferable.

The average particle diameter of the non-magnetic filler is not particularly limited. For example, from the viewpoint of reducing recording errors and securing spacing of a magnetic head, the average particle diameter of the non-magnetic filler is preferably 30 nm to 300 nm, more preferably 40 nm to 250 nm, and even more preferably 50 nm to 200 nm.

In the present disclosure, the average particle diameter of the non-magnetic filler is a value measured using a transmission electron microscope (TEM).

In a case where the composition for forming a magnetic layer contains the non-magnetic filler, the composition may contain only one kind of non-magnetic filler or two or more kinds of non-magnetic fillers.

As the non-magnetic filler, commercial products can be used.

In a case where the composition for forming a magnetic layer contains the non-magnetic filler, the content of the non-magnetic filler in the composition for forming a magnetic layer is not particularly limited. For example, the content of the non-magnetic filler with respect to 100 parts by mass of the $\varepsilon$-iron oxide particles is preferably 0.01 parts by mass to 10 parts by mass.

—Lubricant—

The composition for forming a magnetic layer can contain a lubricant.

The lubricant can contribute, for example, to the improvement of running durability of a magnetic recording medium.

As the lubricant, known hydrocarbon-based lubricant, fluorine-based lubricant, and the like can be used. Examples of the hydrocarbon-based lubricant include a carboxylic acid-based compound such as oleic acid or stearic acid, an ester-based compound such as butyl stearate, a sulfonic acid-based compound such as octadecyl sulfonate, a phosphoric acid ester-based compound such as monooctadecyl phosphate, an alcohol-based compound such as stearyl alcohol or oleyl alcohol, a carboxylic acid amide-based compound such as stearic acid amide, an amine-based compound such as stearyl amine, and the like.

For example, from the viewpoint of further improving the effect of reducing friction force, as the hydrocarbon-based lubricant, a compound is preferable which has a polar group such as a hydroxyl group, an ester group, or a carboxy group in a hydrocarbon chain of an alkyl group.

Examples of the fluorine-based lubricant include a compound obtained in a case where the alkyl group of the aforementioned hydrocarbon-based lubricant is partially or totally substituted with a fluoroalkyl group or a perfluoropolyether group.

In a case where the composition for forming a magnetic layer contains the lubricant, the composition may contain only one kind of lubricant or two or more kinds of lubricants.

As the lubricant, commercial products can be used.

In a case where the composition for forming a magnetic layer contains the lubricant, the content of the lubricant in the composition for forming a magnetic layer is not particularly limited. For example, the content of the lubricant with respect to 100 parts by mass of the $\varepsilon$-iron oxide particles is preferably 0.1 parts by mass to 20 parts by mass, and more preferably 0.5 parts by mass to 15 parts by mass.

—Dispersant—

The composition for forming a magnetic layer can contain a dispersant.

The dispersant can contribute to the improvement of the dispersibility of the $\varepsilon$-iron oxide particles and the prevention of the aggregation of the powder. Furthermore, the dispersant can contribute to the improvement of the dispersibility of the abrasive.

As the dispersant, an organic compound is preferable which has a functional group adsorbed onto the surface of each of the $\varepsilon$-iron oxide particles.

Examples of the organic compound having a functional group adsorbed onto the surface of each of the $\varepsilon$-iron oxide particles include a compound having 1 to 3 amino groups, 1 to 3 carboxy groups, 1 to 3 sulfonic acid groups, or 1 to 3 sulfinic acid groups. The dispersant may be a polymer of these.

As the dispersant, for example, compounds are preferable which are represented by structural formulae such as R—$NH_2$, $NH_2$—R—$NH_2$, $NH_2$—R($NH_2$)—$NH_2$, R—COOH, COOH—R—COOH, COOH—R(COOH)—COOH, R—$SO_3H$, $SO_3H$—R—$SO_3H$, $SO_3H$—R($SO_3H$)—$SO_3H$, R—$SO_2H$, $SO_2H$—R—$SO_2H$, and $SO_2H$—R($SO_2H$)—$SO_2H$.

R in the structural formulae represents a linear, branched, or cyclic saturated or unsaturated hydrocarbon group. For example, R is preferably an alkyl group having 1 to 20 carbon atoms.

Specifically, as the dispersant, for example, oleic acid, stearic acid, 2,3-dihydroxynaphthalene, and the like are preferable.

Among these, as the dispersant, from the viewpoint of dispersibility, at least one kind of compound selected from oleic acid and 2,3-dihydroxynaphthalene is more preferable.

In a case where the composition for forming a magnetic layer contains the dispersant, the composition may contain only one kind of dispersant or two or more kinds of dispersants.

As the dispersant, commercial products can be used.

In a case where the composition for forming a magnetic layer contains the dispersant, the content of the dispersant in the composition for forming a magnetic layer is preferably 0.1 parts by mass to 30 parts by mass with respect to 100 parts by mass of the $\varepsilon$-iron oxide particles (with respect to the total amount of the $\varepsilon$-iron oxide particles and an abrasive in a case where the composition contains the abrasive).

In a case where the content of the dispersant in the composition for forming a magnetic layer is within the above range with respect to 100 parts by mass of the ε-iron oxide particles (with respect to the total amount of the ε-iron oxide particles and an abrasive in a case where the composition contains the abrasive), for example, the dispersibility of the ε-iron oxide particles (the ε-iron oxide particles and an abrasive in a case where the composition contains the abrasive) is further improved, and the abrasion resistance of the formed magnetic layer can be further improved.

—Curing Agent—

The composition for forming a magnetic layer can contain a curing agent.

The curing agent can contribute to the improvement of film hardness. In a case where the curing agent is used, a crosslinking structure is formed between the curing agent and the aforementioned binder forming a magnetic layer, and consequently, the film hardness of the magnetic layer can be improved.

As the curing agent, an isocyanate-based compound is preferable.

Examples of the isocyanate-based compound include tolylene diisocyanate, 4,4'-diphenylmethane diisocyanate, hexamethylene diisocyanate, xylylene diisocyanate, naphthalene-1,5-diisocyanate, o-toluidine diisocyanate, isophorone diisocyanate, triphenylmethane triisocyanate, and the like.

As the isocyanate-based compound, it is also possible to use polyisocyanate such as a product of a reaction between the aforementioned isocyanate-based compound and polyalcohol and a condensation product of the aforementioned isocyanate-based compound.

As the curing agent, commercial products can be used.

Examples of the commercial products of the isocyanate-based compound as the curing agent include CORONATE (registered trademark) L, CORONATE (registered trademark) HL, CORONATE (registered trademark) 2030, CORONATE (registered trademark) 2031, CORONATE (registered trademark) 3041, MILLIONATE (registered trademark) MR, and MILLIONATE (registered trademark) MTL from Tosoh Corporation, TAKENATE (registered trademark) D-102, TAKENATE (registered trademark) D-110N, TAKENATE (registered trademark) D-200, and TAKENATE (registered trademark) D-202 from Mitsui Chemicals, Inc., DESMODUR (registered trademark) L, DESMODUR (registered trademark) IL, DESMODUR (registered trademark) N, and DESMODUR (registered trademark) HL from COVESTRO, and the like (all of the above are trade names).

In a case where the composition for forming a magnetic layer contains the curing agent, the composition may contain only one kind of curing agent or two or more kinds of curing agents.

As the curing agent, commercial products can be used.

In a case where the composition for forming a magnetic layer contains the curing agent, the content of the curing agent in the composition for forming a magnetic layer can be set to be greater than 0 parts by mass and equal to or smaller than 80 parts by mass with respect to 100 parts by mass of the binder. From the viewpoint of improving the hardness of the magnetic layer, the content of the curing agent can be set to be 10 parts by mass to 80 parts by mass with respect to 100 parts by mass of the binder.

—Solvent—

The composition for forming a magnetic layer contains solvents.

The solvents can make a contribution as a dispersant for the ε-iron oxide particles, the binder, the abrasive, and the like.

As the solvents, organic solvents are preferable.

As the organic solvents, it is possible to use a ketone-based compound such as acetone, methyl ethyl ketone, methyl isobutyl ketone, diisobutyl ketone, cyclohexanone, isophorone, or tetrahydrofuran, an alcohol-based compound such as methanol, ethanol, propanol, butanol, isobutyl alcohol, isopropyl alcohol, or methyl cyclohexanol, an ester-based compound such as methyl acetate, butyl acetate, isobutyl acetate, isopropyl acetate, ethyl lactate, or glycol acetate, a glycol ether-based compound such as glycol dimethyl ether, glycol monoethyl ether, dioxane, an aromatic hydrocarbon-based compound such as benzene, toluene, xylene, cresol, or chlorobenzene, a chlorinated hydrocarbon-based compound such as methylene chloride, ethylene chloride, carbon tetrachloride, chloroform, ethylene chlorohydrin, or dichlorobenzene, N,N-dimethylformamide, hexane, and the like.

Among these, as the organic solvent, a mixed solvent containing methyl ethyl ketone and cyclohexanone is preferable.

In the manufacturing method of a magnetic recording medium, the solvents include at least two kinds of organic solvents consisting of an organic solvent having a boiling point equal to or higher than 150° C. and an organic solvent having a boiling point lower than 150° C. In all the organic solvents used for preparing the composition for forming a magnetic layer, a content rate of the organic solvent having a boiling point equal to or higher than 150° C. is 5% by mass to 40% by mass.

Specifically, in a suitable example, the composition for forming a magnetic layer contains, as organic solvents, methyl ethyl ketone having a boiling point of 89.64° C. and cyclohexanone having a boiling point of 155.6° C., and the content of the cyclohexanone in the mixed solvent of the methyl ethyl ketone and the cyclohexanone with respect to the total mass of the mixed solvent is 5% by mass to 30% by mass.

The content rate of the organic solvent having a boiling point equal to or higher than 150° C. in all the organic solvents is preferably 5% by mass to 40% by mass, more preferably 6% by mass to 28% by mass, and even more preferably 10% by mass to 20% by mass.

Provided that the content rate of the organic solvent having a boiling point equal to or higher than 150° C. in all the organic solvents is within the above range, in a case where a layer of the composition for forming a magnetic layer is formed by the step F following the step E by using the composition for forming a magnetic layer, a magnetic field alignment treatment is performed by the step G, and then a magnetic layer is formed by drying the layer of the composition for forming a magnetic layer in the step H, it is considered that the organic solvents may be excellently removed, and the magnetic layer may be cured in a state where the alignment of the magnetic particles are excellently maintained as at the time of forming the layer of the composition for forming a magnetic layer and at the time of performing the magnetic field alignment treatment. It is considered that accordingly, a magnetic layer containing magnetic particles aligned in a better-controlled manner may be formed, and SQ of in the longitudinal direction may be easily controlled within the desired range. Furthermore, it is considered that as a result, SNR of the obtained magnetic recording medium may be further improved.

From a different viewpoint, for example, in order to improve the dispersibility of the ε-iron oxide particles and the like, as an organic solvent, a solvent having a relatively high polarity is preferable. It is preferable that the composition for forming a magnetic layer contains a solvent having a dielectric constant equal to or higher than 15 in an amount equal to or greater than 50% by mass with respect to the total mass of solvents. Furthermore, a solubility parameter of the solvent is preferably 8 to 11.

<Step F>

The step F is a step of applying the composition for forming a magnetic layer onto a non-magnetic support after the step E so as to form a layer of the composition for forming a magnetic layer.

The step F can be performed, for example, by coating the non-magnetic support, which is running, with the composition for forming a magnetic layer so as to obtain a predetermined film thickness.

In the present disclosure, "non-magnetic support" means a support satisfying at least one of the remanent flux density equal to or lower than 10 mT or coercivity equal to or lower than 7.98 kA/m (100 Oe).

As the non-magnetic support, known non-magnetic supports used in magnetic recording media can be used without particular limitation.

The material of the non-magnetic support can be appropriately selected from materials without magnetism according to the type of the magnetic recording medium in consideration of the physical properties such as molding properties, durability, and the like. Examples of the material of the non-magnetic support include materials such as a resin material which does not contain a magnetic material and an inorganic material without magnetism.

Examples of the resin material include polyester such as polyethylene terephthalate (PET) or polyethylene naphthalate (PEN), polyolefin such as polyethylene or polypropylene, a polyamide-based resin such as polyamide, polyamide imide, or aromatic polyamide containing polyaramid, polyimide, cellulose triacetate (TAC), polycarbonate (PC), polysulfone, polybenzoxasole, and the like.

Among these, as the resin material, from the viewpoint of excellent hardness and durability and ease of processing, at least one kind of material selected from the group consisting of polyester and a polyamide-based resin is preferable, and at least one kind of material selected from the group consisting of polyethylene terephthalate (PET), polyethylene naphthalate (PEN), and polyamide is more preferable.

The non-magnetic support is selected according to the way the magnetic recording medium is used.

For example, in a case where the magnetic recording medium is used in the form of a magnetic tape, a flexible disk, or the like, as the non-magnetic support, a flexible resin film (or resin sheet) can be used.

In a case where a resin film is used as the non-magnetic support, the resin film may be a non-stretched resin film or a stretched film which is uniaxially or biaxially stretched. For example, in a case where a polyester film is used as the non-magnetic support, from the viewpoint of improving the dimensional stability, a biaxially stretched polyester film may be used.

The resin film used as the non-magnetic support may have a laminated structure including two or more layers. For examples, as described in JP1991-224127A (JP-H03-224127A), in order to change surface roughness between a surface on which a magnetic layer will be formed and a surface on which a magnetic layer will not be formed, a non-magnetic support obtained by laminating two layers of different films can also be used.

If necessary, for example, for the purpose of improving the adhesiveness with respect to the magnetic layer to be provided on a surface of the non-magnetic support, a surface treatment such as corona discharge, a plasma treatment, an easy adhesion treatment, or a heat treatment may be performed in advance on the non-magnetic support. Furthermore, for example, in order to inhibit foreign substances from being mixed into the magnetic layer, a surface treatment such as a dust protection treatment may be performed on the non-magnetic support.

These surface treatments can be performed by known methods.

The thickness of the non-magnetic support is not particularly limited, and is appropriately selected according to the way the magnetic recording medium is used.

The thickness of the non-magnetic support is preferably 2.0 μm to 80.0 μm and more preferably 3.0 μm to 50.0 μm, for example.

In a case where the thickness of the non-magnetic support is equal to or greater than 2.0 μm, film formability becomes excellent, and higher hardness can be obtained.

In a case where the thickness of the non-magnetic support is equal to or smaller than 80.0 μm, the total thickness of a magnetic recording medium does not unnecessarily increase.

In a case where the magnetic recording medium is used in the form of a magnetic tape, the thickness of the non-magnetic support is preferably 2.0 μm to 20.0 μm, and more preferably 3.0 μm to 10.0 μm.

The non-magnetic support can be coated with the composition for forming a magnetic layer by known methods such as an air doctor coating, blade coating, rod coating, extrusion coating, air knife coating, squeeze coating, immersion coating, reverse roll coating, transfer roll coating, gravure coating, kiss coating, cast coating, spray coating, and spin coating.

Regarding the coating method, for example, "Latest Coating Techniques" (May 31, 1983) published from SOGO GIJUTSU CENTER can be referred to.

The amount of the composition for forming a magnetic layer used for coating is not particularly limited.

According to a saturated magnetization amount of a magnetic head used for the magnetic recording medium, a head gap length, a recording signal bandwidth, and the like, the amount of the composition for forming a magnetic layer used for coating is appropriately adjusted such that the magnetic layer has the desired thickness.

The composition for forming a magnetic layer is used for coating, preferably in an amount that makes the magnetic layer have a thickness of 10 nm to 150 nm after drying, more preferably in an amount that makes the magnetic layer have a thickness of 20 nm to 120 nm after drying, and even more preferably in an amount that makes the magnetic layer have a thickness of 30 nm to 100 nm after drying.

In a case where the thickness of the magnetic layer is equal to or greater than 10 nm, the recording density can be further improved.

In a case where the thickness of the magnetic layer is equal to or smaller than 150 nm, noise is further reduced, and electromagnetic conversion characteristics are further improved.

<Step G>

The step G is a step of performing a magnetic field alignment treatment on the formed layer of the composition for forming a magnetic layer after the step F.

In a case where the non-magnetic support of the formed layer of the composition for forming a magnetic layer is in the form of a film such as a magnetic tape, a magnetic field alignment treatment can be performed on the ε-iron oxide particles contained in the composition for forming a magnetic layer by using a cobalt magnet, a solenoid, or the like.

As the method of the magnetic field alignment treatment, methods of using known random alignment apparatuses, such as a method of obliquely and alternately arranging cobalt magnets and a method of applying alternating magnetic fields by using a solenoid, are preferable. Furthermore, by vertically aligning magnetic fields by using a known method such as a method of using magnets with the opposite poles facing each other, isotropic magnetic characteristics can be imparted along a circumferential direction. Particularly, in a case where high-density recording is performed, vertical alignment is preferable. In addition, magnetic fields can be aligned along a circumferential direction by spin coating.

It is preferable that the magnetic field alignment treatment is performed before the formed layer of the composition for forming a magnetic layer is dried.

The magnetic field alignment treatment can be performed by a vertical alignment treatment in which a magnetic field with a magnetic field intensity of 0.1 T to 1.0 T is applied in a direction perpendicular to the surface coated with the composition for forming a magnetic layer.

<Step H>

The step H is a step of drying the layer of the composition for forming a magnetic layer having undergone the magnetic field alignment treatment after the step G so as to form a magnetic layer.

The drying of the layer of the composition for forming a magnetic layer can be controlled by the temperature and the amount of drying air and the coating speed.

The coating speed is preferably set to be 20 m/min to 1,000 m/min for example.

The temperature of the drying air is preferably equal to or higher than 60° C. for example.

Before the application of the magnetic field, the layer of the composition for forming a magnetic layer may be appropriately pre-dried.

In the manufacturing method of a magnetic recording medium of the present disclosure, the physical properties of the organic solvents in the composition for forming a magnetic layer prepared by the step E are controlled in a preferred range. Therefore, in the obtained magnetic recording medium, the coefficient of variation of the aspect ratio of the ε-iron oxide particles used and SQ in the longitudinal direction are controlled, and SNR is further improved.

The manufacturing method of a magnetic recording medium of the present disclosure can include optional steps in addition to the step E, the step F, the step G, and the step H described above.

Regarding various other optional steps in the manufacturing method of a magnetic recording medium, what is described in paragraphs "0067" and "0070" in JP2010-231843A can be referred to.

Examples of the optional steps include a step of performing a calender treatment on the non-magnetic support having the magnetic layer, a step of forming an optional layer such as a non-magnetic layer or a backcoat layer, a step of forming a servo pattern on the magnetic recording medium, and the like.

Each of the steps described above and the optional steps which will be described later may be divided into two or more stages.

(Step of Performing Calender Treatment on Non-Magnetic Support Having Magnetic Layer)

The non-magnetic support having the magnetic layer can be wound up around a winding roll and then wound off the winding roll so as to be subjected to the calender treatment.

By the calender treatment, the surface smoothness is improved, the holes that occur due to the removal of solvents at the time of drying disappear, and accordingly, the filling rate of the ε-iron oxide particles in the magnetic layer is improved. Therefore, a magnetic recording medium with excellent electromagnetic conversion characteristics (for example, SNR) can be obtained.

It is preferable to perform the calender treatment by changing the calender treatment conditions according to the surface smoothness of the magnetic layer.

In the calender treatment, for example, a super calender roll can be used.

As the calender roll, it is possible to use a heat-resistant plastic roll formed of a resin such as an epoxy-based resin, a polyimide-based resin, a polyamide-based resin, or a polyamide imide-based resin. Furthermore, a metal roll can also be used for the treatment.

Regarding the calender treatment conditions, the surface temperature of the calender roll can be set to be 60° C. to 120° C. and preferably set to be 80° C. to 100° C. for example, and the pressure (so-called line pressure) can be set to be 100 kg/cm to 500 kg/cm (98 kN/m to 490 kN/m) and preferably set to be 200 kg/cm to 450 kg/cm (196 kN/m to 441 kN/m) for example.

(Step of Forming Optional Layer)

If necessary, the manufacturing method of a magnetic recording medium of the present disclosure can include a step of forming an optional layer such as a non-magnetic layer or a backcoat layer.

The non-magnetic layer is a layer which contributes to thinning of the magnetic layer. The non-magnetic layer can be provided between the non-magnetic support and the magnetic layer.

The backcoat layer is a layer which contributes to running stability and the like. The backcoat layer can be provided on a surface of the non-magnetic support that is opposite to the magnetic layer side.

The non-magnetic layer and the backcoat layer can be formed by preparing compositions for forming these layers (so-called composition for forming a non-magnetic layer and composition for forming a backcoat layer) and then performing the same steps as the step F and the step G for forming the magnetic layer.

The non-magnetic layer includes a layer without magnetism and a substantially non-magnetic layer containing a small amount of ferromagnetic substance (for example, ε-iron oxide particles) which is an impurity or an intentionally added substance.

In the present disclosure, "non-magnetic layer" means a layer which satisfies at least one of the remanent flux density equal to or lower than 10 mT or coercivity equal to or lower than 7.98 kA/m (100 Oe).

(Composition for Forming Non-Magnetic Layer)
—Non-Magnetic Particles—

It is preferable that the composition for forming a non-magnetic layer contains non-magnetic particles.

The non-magnetic particles can function as a filler.

In the present disclosure, "non-magnetic particles" mean particles which satisfy at least one of the remanent flux density equal to or lower than 10 mT or coercivity equal to or lower than 7.98 kA/m (100 Oe).

The non-magnetic particles may be inorganic particles or organic particles.

As the non-magnetic particles, carbon black can also be used.

Examples of the inorganic particles include particles of a metal, a metal oxide, a metal carbonate, a metal sulfate, a metal nitride, a metal carbide, a metal sulfide, and the like.

Specifically, examples of the non-magnetic particles include a titanium oxide such as titanium dioxide, cerium oxide, tin oxide, tungsten oxide, ZnO, $ZrO_2$, $SiO_2$, $Cr_2O_3$, α-alumina with an α transformation rate equal to or higher than 90%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and the like.

Among these, α-iron oxide is preferable as the non-magnetic particles.

The shape of the non-magnetic particles is not particularly limited, and may be any of a needle shape, a spherical shape, a polyhedral shape, or a plate shape.

The average particle diameter of the non-magnetic particles is preferably 5 nm to 500 nm and more preferably 10 nm to 200 nm for example.

In a case where the average particle diameter of the non-magnetic particles is within the above range, the dispersibility of the non-magnetic particles is further improved, and the surface roughness of the formed non-magnetic layer can be more suitably adjusted.

By combining non-magnetic particles having different average particle diameters or adjusting the particle size distribution of the non-magnetic particles, the dispersibility of the non-magnetic particles and the surface roughness of the non-magnetic layer can be more suitably adjusted.

The average particle diameter of the non-magnetic particles is a value measured using a transmission electron microscope (TEM).

The BET specific surface area of the non-magnetic particles is preferably 50 $m^2$/g to 150 $m^2$/g for example.

In a case where the composition for forming a non-magnetic layer contains the non-magnetic particles, the composition may contain only one kind of non-magnetic particles or two or more kinds of non-magnetic particles.

The non-magnetic particles are available as commercial products or can be manufactured by known methods.

In a case where the composition for forming a non-magnetic layer contains the non-magnetic particles, the content rate of the non-magnetic particles in the composition for forming a non-magnetic layer is preferably 50% by mass to 90% by mass, and more preferably 60% by mass to 90% by mass, with respect to the amount of solid contents in the composition for forming a non-magnetic layer.

—Binder—

It is preferable that the composition for forming a non-magnetic layer contains a binder.

The binder in the composition for forming a non-magnetic layer has the same definition as the binder described above in the section of the composition for forming a magnetic layer, and preferred aspects thereof are also the same. Therefore, the binder will not be described herein.

—Other Additives—

If necessary, the composition for forming a non-magnetic layer may contain various additives (that is, other additives) in addition to the non-magnetic particles and the binder described above.

Those other additives in the composition for forming a non-magnetic layer have the same definition as other additives described in the section of the composition for forming a magnetic layer, and preferred aspects thereof are also the same. Therefore, those other additives will not be described herein.

The amount of the composition for forming a non-magnetic layer used for coating is not particularly limited.

The composition for forming a non-magnetic layer is used for coating, preferably in an amount that makes the non-magnetic layer have a thickness of 0.05 μm to 3.0 μm after drying, more preferably in an amount that makes the non-magnetic layer have a thickness of 0.05 μm to 2.0 μm after drying, and even more preferably in an amount that makes the non-magnetic layer have a thickness of 0.05 μm to 1.5 μm after drying.

(Composition for Forming Hardcoat Layer)
—Non-Magnetic Particles—

It is preferable that the composition for forming a hardcoat layer contains non-magnetic particles.

The non-magnetic particles in the composition for forming a hardcoat layer have the same definition as the non-magnetic particles described above in the section of the composition for forming a non-magnetic layer, and preferred aspects thereof are also the same. Therefore, the non-magnetic particles will not be described herein.

—Binder—

It is preferable that the composition for forming a backcoat layer contains a binder.

The binder in the composition for forming a backcoat layer has the same definition as the binder described above in the section of the composition for forming a magnetic layer, and preferred aspects thereof are also the same. Therefore, the binder will not be described herein.

—Other Additives—

If necessary, the composition for forming a backcoat layer may contain various additives (that is, other additives) in addition to the non-magnetic particles and the binder described above.

Those other additives in the composition for forming a hardcoat layer have the same definition as other additives described above in the section of the composition for forming a magnetic layer, and preferred aspects thereof are also the same. Therefore, those other additives will not be described herein.

The amount of the composition for forming a backcoat layer used for coating is not particularly limited.

The composition for forming a backcoat layer is used for coating, preferably in an amount that makes the backcoat layer have a thickness equal to or smaller than 0.9 μm after drying, and more preferably in an amount that makes the backcoat layer have a thickness of 0.1 μm to 0.7 μm after drying.

(Step of Forming Servo Pattern)

In a case where a magnetic tape is manufactured as the magnetic recording medium, in order that the tracking of a magnetic head in a magnetic tape apparatus, the running speed of the magnetic tape, and the like can be controlled, the manufacturing method can include a step of forming a servo pattern on the magnetic recording medium by a known method.

The servo pattern is servo data used for positioning a magnetic head on a data track. From the viewpoint of further improving the recording density, it is preferable to form a servo pattern on the magnetic recording medium.

"Formation of a servo pattern" is referred to as "recording of servo signals" in some cases. Generally, the servo signals are recorded along the longitudinal direction of the magnetic tape. Examples of control methods (servo control) using servo signals include a timing-based servo (TBS) method, an amplitude servo method, a frequency servo method, and the like.

Hereinafter, the servo signal recording will be further described based on typical aspects thereof.

As being specified in European Computer Manufacturers Association (ECMA)-319, for magnetic tapes based on the Linear Tape-Open (LTO) standard (referred to as "LTO tape" in general), as a servo signal recording method, a timing-based servo method is adopted.

In the time-based servo method, servo signals are constituted with a plurality of pairs of magnetic stripes (referred to as "servo stripes" as well), which are not parallel with each other, continuously arranged in the longitudinal direction of a magnetic tape.

The servo signals are constituted with pairs of magnetic stripes that are not parallel with other because, for example, a servo signal reading element passing over the servo signals is caused to detect where the element passes. Specifically, the pair of magnetic stripes are formed such that the space between the stripes continuously changes along the width direction of the magnetic tape. By reading the space, the servo signal reading element can detect the relative position of the servo signal reading element with respect to the servo signals.

The information on the relative position obtained as above enables the tracking of a data track. Accordingly, generally, a plurality of servo tracks are set on the servo signals along the width direction of the magnetic tape. The region in which a plurality of servo tracks are set is also called servo band. In the magnetic tape, a plurality of servo bands are formed through data tracks, and a plurality of servo signals are written on the servo bands.

A servo band is constituted with a plurality of servo signals that continue in the longitudinal direction of a magnetic tape. Generally, a magnetic tape is provided with a plurality of servo bands. For example, an LTO tape has 5 servo bands. The region between two adjacent servo bands is called data band. The data band is constituted with a plurality of data tracks, and each of the data tracks is for each of the servo tracks.

For example, in one of the aspects of the servo band, as described in JP2004-318983A, the information showing a servo band number (referred to as "servo band identification (ID) or Unique Data Band Identification Method (UDIM) information" as well) is embedded in each servo band.

Specific servo stripes among the plurality of pairs of servo stripes in a servo band are dislocated such that the positions thereof change relative to the longitudinal direction of the magnetic tape, and in this way, the servo band ID is recorded. Specifically, the method for dislodging specific servo stripes among the plurality of pairs of servo stripes varies among the servo bands. As a result, a unique servo band ID is recorded in each of the servo bands. Accordingly, simply by reading one servo band by using a servo signal reading element, the servo band can be uniquely identified.

Some of the methods for uniquely identifying a servo band uses a staggered method as described in ECMA-319. In the staggered method, a group of a plurality of pairs of magnetic stripes (servo stripes), which are continuously arranged in the longitudinal direction of a magnetic tape and are not parallel with each other, is recorded such that the magnetic stripes are dislocated along the longitudinal direction of the magnetic tape for each servo band. The combination of the dislocation methods between the adjacent servo bands is regarded as unique to the entire magnetic tape. Therefore, in a case where the servo signals are read using two servo signal reading elements, the servo band can be uniquely identified.

As described in ECMA-319, generally, the information showing the position in the longitudinal direction of a magnetic tape (referred to as "Longitudinal Position (LPOS) information" as well) is embedded in each servo band. Just as the UDIM information, the LPOS information is recorded by dislocating the positions of pairs of servo stripes along the longitudinal direction of the magnetic tape. Here, unlike the UDIM information, the LPOS information causes the same signal to be recorded in each of the servo bands.

It is also possible to embed another information different from the UDIM information and the LPOS information described above in a servo band. In this case, the information to be embedded may vary between servo bands just as the UDIM information or may common to all the servo bands just as the LPOS information.

In order to embed information in servo bands, methods other than the above can also be adopted. For example, predetermined pairs may be thinned out of the group of pairs of servo stripes such that predetermined codes are recorded.

The head for servo signal recording (servo pattern formation) is called servo write head. In the servo write head, the number of pairs of gaps corresponding to the pairs of magnetic stripes described above is the same as the number of servo bands. Generally, each pair of gaps is connected to a core and a coil. In a case where current pulse is supplied to the coil, a magnetic field is generated in the core, and the magnetic field can generate a leakage magnetic field in the pair of gaps. For recording servo signals, a magnetic tape is caused to run on the servo write head, and in this state, current pulse is input in the magnetic tape. In this way, it is possible to record servo signals by transferring magnetic patterns, which correspond to the pair of gaps, to the magnetic tape.

The width of each gap can be appropriately set according to the density of the servo signals to be recorded. For example, the width of each gap can be set to be less than 1 μm, 1 μm to 10 μm, a value greater than 10 μm, and the like.

In the step of forming servo patterns, that is, in the step of recording servo signals, before the servo signals are recorded in a magnetic tape, generally, an erasing treatment can be performed on the magnetic tape.

The erasing treatment performed before the step of recording servo signals can be carried out by applying a uniform magnetic field to the magnetic tape by using a direct current magnet or an alternating current magnet. The erasing treatment is classified into Direct Current (DC) erasing and Alternating Current (AC) erasing.

AC erasing is performed by slowly reducing the intensity of a magnetic field applied to a magnetic tape while reversing the direction of the magnetic field.

DC erasing is performed by applying a unidirectional magnetic field to a magnetic tape. DC erasing also includes two methods. One of the methods is horizontal DC erasing in which a unidirectional magnetic field is applied along the longitudinal direction of a magnetic field. The other method is vertical DC erasing in which a unidirectional magnetic field is applied along the thickness direction of a magnetic tape.

The erasing treatment may be performed on the entirety of a magnetic tape or on each of the servo bands in a magnetic tape.

In the step of forming servo patterns, the direction of the magnetic field of servo signals to be recorded is determined according to the direction of the erasing treatment.

For example, in a case where the horizontal DC erasing is performed on a magnetic tape, servo signals are recorded such that the direction of the magnetic field becomes opposite to the direction of the erasing treatment. In this way, the output at the time of reading the servo signals can be increased. In a case where patterns are transferred to a magnetic tape having undergone the vertical DC erasing by using the aforementioned gaps as described in JP2012-053940A, the recorded servo signals are read in the form of unipolar pulses.

In contrast, in a case where patterns are transferred to a magnetic tape having undergone the horizontal DC erasing by using the aforementioned gaps, the recorded signals are read in the form of bipolar pulses.

In addition to the manufacturing method of a magnetic recording medium of the present disclosure described above, for example, the following manufacturing method is preferred as the manufacturing method of a magnetic recording medium. Hereinafter, the manufacturing method will be referred to as another manufacturing method of a magnetic recording medium in some cases. The aforementioned another manufacturing method of a magnetic recording medium also makes it possible to obtain a magnetic recording medium having a magnetic layer containing excellently aligned ε-iron oxide particles.

The aforementioned another manufacturing method of a magnetic recording medium includes a step E of preparing a composition for forming a magnetic layer containing ε-type iron oxide particles, which are obtained by the manufacturing method of ε-iron oxide particles of the present disclosure described above, and organic solvents, a step F of applying the composition for forming a magnetic layer to a non-magnetic support so as to form a layer of the composition for forming a magnetic layer, a step G of performing a magnetic field alignment treatment on the formed layer of the composition for forming a magnetic layer, and a step H of drying the layer of the composition for forming a magnetic layer having undergone the magnetic field alignment treatment so as to form a magnetic layer, in which the magnetic field alignment treatment is continued until the layer of the composition for forming a magnetic layer is dried by the step H.

All of the step E, the step F, the step G, and the step H in the aforementioned another manufacturing method of a magnetic recording medium as well as optional steps that are included in the manufacturing method as desired are the same as the steps in the manufacturing method of a magnetic recording medium of the present disclosure described above, except that there is no particular limitation on the conditions of the organic solvents used for preparing the composition for forming a magnetic layer by the step F. Therefore, each of the steps will not be specifically described.

In the aforementioned another manufacturing method of a magnetic recording medium, instead of using organic solvents in the step B such that the content rate of an organic solvent having a boiling point equal to or higher than 150° C. is 5% by mass to 40% by mass in all the organic solvents, the magnetic field alignment treatment performed in the step G is continued until the layer of the composition for forming a magnetic layer is dried by the step H following the step G and a magnetic layer is formed.

That is, by continuing the magnetic field alignment treatment until the drying of a magnetic layer is finished and a magnetic layer is formed, the alignment of ε-iron oxide particles in the magnetic layer is fixed in a state where the alignment is preferably maintained. Accordingly, in the obtained magnetic recording medium, the coefficient of variation of the aspect ratio of the used ε-iron oxide particles and SQ in the longitudinal direction are controlled, and SNR is further improved.

"Drying of a magnetic layer is finished" refers to a state where the content of the organic solvents contained in the magnetic layer is equal to or smaller than 1% by mass with respect to the initial content of organic solvents, and the alignment of ε-iron oxide particles in the formed magnetic layer is fixed.

[Recording Method for Magnetic Recording Medium]

The recording method for the magnetic recording medium of the present disclosure may be a helical scan recording method or a linear recording method, and is preferably a linear recording method.

The magnetic recording medium of the present disclosure is excellent in SNR and the film hardness of a magnetic layer. Therefore, the magnetic recording medium is suited for a linear recording method.

It is preferable that the magnetic recording medium of the present disclosure is used for electromagnetic wave-assisted recording.

In the magnetic recording medium of the present disclosure, the ε-iron oxide particles are used as a magnetic material. Because the ε-iron oxide particles have extremely high coercivity, it is difficult for the particles to cause spin inversion. To the magnetic recording medium of the present disclosure, so-called electromagnetic wave-assisted recording is applied in which the ε-iron oxide particles contained in the magnetic layer is irradiated with electromagnetic waves so as to perform recording while causing spin to perform precession and inverting the spin by a magnetic field. In this way, it is possible to excellently perform recording by easily inverting spin only at the time of recording.

EXAMPLES

Hereinafter, the present invention will be more specifically described based on examples, but the present invention is not limited to the following examples as long as the gist of the present invention is maintained.

[Example 1]<Preparation of ε-Iron Oxide Particles>—Preparation of Particles of Magnetic Substance 1—

[Step (A)]

Iron (III) nitrate nonahydrate (33.2 g), 6.0 g of gallium (III) nitrate octahydrate, 856 mg of cobalt (II) nitrate hexahydrate, and 648 mg of titanium (IV) sulfate were added to 360 g of pure water and then stirred using a magnetic stirrer, thereby obtaining an aqueous solution 1 containing a compound having trivalent iron ions.

(Step A)

Furthermore, 4.0 g of citric acid was dissolved in 36 g of pure water, thereby preparing an aqueous citric acid solution.

In the air atmosphere, the aqueous solution 1 was stirred using a magnetic stirrer under the condition of a liquid temperature of 10° C. (reaction temperature). A 25% by mass aqueous ammonia solution (alkali agent, 14.5 g) was added to the aqueous solution 1 being stirred, and then the solution was stirred for 2 hours while keeping the liquid temperature at 10° C., thereby obtaining a mixed solution 2.

(Step B)

For the obtained mixed solution 2, the temperature of the reaction solution was then increased to 80° C. at a rate of 10° C./min, and the solution was further stirred for 5 hours in a state of being kept at a temperature of 80° C. such that the reaction proceeds, thereby obtaining a mixed solution 3.

(Step C)

The aqueous citric acid solution prepared as above was added to the mixed solution 3 obtained by continuing 5 hours of stirring, the obtained solution was stirred for 10 minutes, and the generated precipitates were extracted by centrifugation.

The extracted precipitates were washed with pure water and dried at 80° C., thereby obtaining dried substances. Pure water (1,500 g) were added to the dried substances such that the dried substances were dispersed again, thereby obtaining a dispersion liquid.

The obtained dispersion liquid was heated to 50° C. In a state of stirring the dispersion liquid, 80 g of a 25% by mass aqueous ammonia solution was added dropwise thereto. The obtained solution was further stirred for 1 hour while being kept at a temperature of 50° C. Furthermore, 100 mL of tetraethoxysilane (TEOS) was added dropwise thereto, and the obtained solution was stirred for 24 hours. Then, 100 g of ammonium sulfate was added thereto, thereby obtaining a dispersion liquid containing precipitates.

The generated precipitates were extracted by centrifugation. The extracted precipitates were washed with pure water and dried for 24 hours at 80° C., thereby obtaining precursor particles.

The obtained precursor particles were loaded in a furnace and subjected to a heat treatment at 1,025° C. for 4 hours in an air atmosphere, thereby obtaining heat-treated particles.

(Step D)

The heat-treated particles were put into an 8 mol/L aqueous sodium hydroxide (NaOH) solution, the solution was stirred for 24 hours at a liquid temperature kept at 80° C., and at least a portion of a Si-containing film, which was derived from TEOS and present on the surface of the heat-treated particles, was removed. Then, solid-liquid separation was performed by centrifugation, the obtained solids were washed with pure water and dried, thereby obtaining particles of a magnetic substance 1.

[Check and measurement of obtained particles of magnetic substance]

1. Crystal structure

By an X-ray diffraction (XRD) method, the crystal structure of the magnetic substance 1 was checked.

As a sample for checking, a substance obtained by drying the obtained particles of the magnetic substance 1 was used. As a measurement apparatus, X' Pert Pro diffractometer from Malvern PANalytical was used.

The measurement conditions are as below.

—Measurement Conditions—

X-ray source: Cu Kα ray

[wavelength: 1.54 Å (0.154 nm), power: 40 mA, 45 kV]

Scan range: 20°<2θ<70°

Scan interval: 0.05°

Scan speed: 0.75°/min

As a result, it was confirmed that the magnetic substance 1 was single-phase ε-iron oxide particles which have an ε-type crystal structure and do not have α-type, β-type, and γ-type crystal structures.

2. Composition

The composition of each of the magnetic substance 1 was checked by a high-frequency Inductively Coupled Plasma (ICP) emission spectrometer.

As a sample for checking, a substance obtained by drying the particles of the magnetic substance 1 was used. As a measurement apparatus, ICPS-8100 (trade name) from Shimadzu Corporation was used.

Specifically, a container filled with 12 mg of the particles of the magnetic substance 1 and 10 mL of a 4 mol/L aqueous hydrochloric acid solution was kept on a hot plate with a set temperature of 80° C. for 3 hours, thereby obtaining a solution. Pure water (30 mL) was added to the obtained solution, and then the solution was filtered using a 0.1 μm membrane filter, thereby obtaining a filtrate. For the obtained filtrate, elemental analysis was performed using the measurement apparatus described above.

Based on the obtained results of the elemental analysis, the content rate of each of the metal atoms with respect to 100 at % of iron atoms was determined. Furthermore, based on the obtained content rate, the composition of the ε-iron oxide particles was checked. The composition of each of the ε-iron oxide particles is shown in Table 1.

3. Shape of Particles of Magnetic Substance

By using a transmission electron microscope (TEM), the shape of the magnetic substance 1 was observed. As a result, it was confirmed that all of the particles of the magnetic substance 1 have a spherical shape.

4. Size and Coefficient of Variation of Aspect Ratio of Particles

Average equivalent circular diameter and coefficient of variation of aspect ratio of particles of magnetic substance The average equivalent circular diameter and the coefficient of variation of the aspect ratio (average major axis length/average minor axis length) of the particles of the magnetic substance 1 were determined by the following method.

As a sample for checking, a substance obtained by drying the particles of the magnetic substance 1 was used.

By using a transmission electron microscope (TEM) (model NO.: H-9000, Hitachi High-Technologies Corporation), the particles of the magnetic substance 1 were imaged at 80,000× magnification and printed on printing paper at a total magnification of 500,000×. From each of the printed particles, primary particles were selected, and the contour of the primary particles was traced using a digitizer. The primary particles mean independent particles not being aggregated. The major axis length and the minor axis length in the traced contour were determined using free software Image J.

For 500 particles randomly extracted from the primary particles printed on several sheets of printing paper, the major axis length and the minor axis length were determined. For each of the determined major axis lengths and the minor axis lengths of the 500 particles, a simple average (that is, a number average) was calculated, thereby determining the average equivalent circular diameter.

The contour of the traced particle was approximated to an ellipse by using image analysis software, the major axis and the minor axis of the ellipse were calculated, and the aspect ratio was determined by "aspect ratio=major axis/minor axis". The coefficient of variation of the aspect ratio was determined by "standard deviation of aspect ratio/average of aspect ratio x 100".

The results are shown in the following Table 1.

[Preparation of magnetic recording medium (magnetic tape)]

1. Preparation of composition for forming magnetic layer

A composition for forming a magnetic layer having the following makeup was prepared by the following method.

First, the components of a magnetic liquid having the following composition were dispersed for 24 hours by using a batch-type vertical sand mill and zirconia beads (first dispersion beads, density: 6.0 g/cm$^3$) having a bead size of 0.5 mmϕ, (first dispersion).

Then, the dispersion obtained by the first dispersion was filtered using a filter having an average pore size of 0.5 μm, thereby obtaining a dispersion liquid A. In the first dispersion, the amount of zirconia beads (first dispersion beads) used was 1,000% of the amount of the magnetic powder based on mass.

Thereafter, the dispersion liquid A was dispersed for 1 hour by using a batch-type vertical sand mill and diamond beads (second dispersion beads, density: 3.5 g/cm$^3$) having a bead size of 500 nmϕ, (second dispersion).

Subsequently, by using a centrifuge, a centrifugation treatment was performed on the dispersion obtained by the second dispersion, thereby obtaining a dispersion liquid B. The obtained dispersion liquid B was used as a magnetic liquid.

Then, the components of an abrasive liquid having the following composition were dispersed for 2 hours by using a horizontal beads mill and zirconia beads having a bead size of 0.3 mmϕ. During the dispersion, the zirconia beads used were adjusted such that the filling rate of the beads became 80% by volume.

Thereafter, by using a flow-type ultrasonic dispersion filtration apparatus, an ultrasonic dispersion filtration treatment was performed on the dispersion obtained by dispersion, thereby obtaining an abrasive liquid.

Subsequently, the magnetic liquid and the abrasive liquid prepared as above and a liquid containing a non-magnetic filler, a lubricant, and a curing agent having the following composition were put into a dissolver stirrer and stirred for 30 minutes at a circumferential speed of 10 m/s (second).

Then, by using a flow-type ultrasonic disperser, the liquid obtained by stirring was treated 3 passes at a flow rate of 7.5 kg/min. Thereafter, the liquid was filtered using a filter having an average pore size of 1 μm, thereby obtaining a composition for forming a magnetic layer (step E).

In Example 1, the content of cyclohexanone (solvent having a boiling point equal to or higher than 150° C.) with respect to the composition for forming a magnetic layer was 31.4%.

In the following examples and comparative examples, the content ratio between methyl ethyl ketone and cyclohexanone used in a magnetic liquid were adjusted such that the content of cyclohexanone with respect to the composition for forming a magnetic layer was adjusted.

| <Makeup of composition for forming magnetic layer> | |
|---|---|
| -Magnetic liquid- | |
| Magnetic powder | 100.0 parts by mass |
| (magnetic powder 1 prepared as above) | |
| Oleic acid (lubricant) | 2.0 parts by mass |
| Vinyl chloride resin (binder) | 10.0 parts by mass |
| (trade name: MR-104, ZEON CORPORATION) | |
| SO$_3$Na group-containing polyurethane resin (binder) | 4.0 parts by mass |
| (weight-average molecular weight: 70,000, SO$_3$Na group: 0.07 meq/g) | |
| Methyl ethyl ketone (organic solvent) | 260.0 parts by mass |
| Cyclohexanone (organic solvent) | 40.0 parts by mass |
| -Abrasive liquid- | |
| α-Alumina (abrasive) | 6.0 parts by mass |
| (BET specific surface area: 19 m$^2$/g, Mohs hardness: 9) | |
| SO$_3$Na group-containing polyurethane resin (binder) | 0.6 parts by mass |
| (weight-average molecular weight: 70,000, SO$_3$Na group: 0.1 meq/g) | |
| 2,3-Dihydroxynaphthalene (dispersant) | 0.6 parts by mass |
| Cyclohexanone (organic solvent) | 23.0 parts by mass |
| -Non-magnetic filler liquid- | |
| Colloidal silica (non-magnetic filler) | 2.0 parts by mass |
| (average particle diameter: 120 nm) | |
| Methyl ethyl ketone (organic solvent) | 8.0 parts by mass |
| -Liquid containing lubricant and curing agent- | |
| Stearic acid (lubricant) | 3.0 parts by mass |
| Stearic acid amide (lubricant) | 0.3 parts by mass |
| Butyl stearate (lubricant) | 6.0 parts by mass |
| Polyisocyanate (curing agent) | 3.0 parts by mass |
| (trade name: CORONATE (registered trademark) L, Tosoh Corporation) | |
| Methyl ethyl ketone (organic solvent) | 110.0 parts by mass |
| Cyclohexanone (organic solvent) | 110.0 parts by mass |

2. Preparation of Composition for Forming Non-Magnetic Layer

A composition for forming a non-magnetic layer having the following makeup was prepared by the following method.

First, the components of the composition for forming a non-magnetic layer having the following composition were dispersed for 24 hours by using a batch-type vertical sand mill and zirconia beads having a bead size of 0.1 mmϕ.

Then, the dispersion obtained by dispersion was filtered using a filter having an average pore size of 0.5 μm, a composition for forming a non-magnetic layer was obtained.

<Makeup of composition for forming non-magnetic layer>

| | |
|---|---|
| α-Iron oxide (non-magnetic filler) (average particle diameter (average major axis length): 10 nm, average aspect ratio: 1.9, BET specific surface area: 75 m²/g) | 100.0 parts by mass |
| Carbon black (non-magnetic filler) (average particle diameter: 20 nm) | 25.0 parts by mass |
| SO₃Na group-containing polyurethane resin (binder) (weight-average molecular weight: 70,000, SO₃Na group: 0.2 meq/g) | 18.0 parts by mass |
| Stearic acid (lubricant) | 1.0 part by mass |
| Methyl ethyl ketone (organic solvent) | 300.0 parts by mass |
| Cyclohexanone (organic solvent) | 300.0 parts by mass |

3. Preparation of Composition for Forming Backcoat Layer

A composition for forming a backcoat layer having the following makeup was prepared by the following method.

First, the components of the composition for forming a backcoat layer having the following makeup except for stearic acid and butyl stearate as lubricants, polyisocyanate as a curing agent, and cyclohexanone (A) were kneaded and diluted using an open kneader. For dilution, a mixed solvent of methyl ethyl ketone and cyclohexanone was used.

Then, the substance obtained by kneading and dilution was dispersed using a horizontal beads mill and zirconia beads having a bead size of 1 mmϕ (first dispersion). During the first dispersion, the zirconia beads used was adjusted such that the filling rate of the beads became 80% by volume. Furthermore, during the first dispersion, the circumferential speed of a rotor tip of the horizontal beads mill was set to be 10 m/s (second), and the dispersion treatment was performed 12 passes by setting a retention time per 1 pass to be 2 minutes.

Thereafter, the remaining components (that is, stearic acid and butyl stearate as lubricants, polyisocyanate as a curing agent, and cyclohexanone (A)) were added to the dispersion obtained by the first dispersion, and stirred using a dissolver stirrer.

Subsequently, the dispersion obtained by stirring was filtered using a filter having an average pore size of 1 μm, thereby obtaining a composition for forming a backcoat layer.

<Makeup of composition for forming backcoat layer>

| | |
|---|---|
| α-Iron oxide (non-magnetic filler) (average particle diameter (average major axis length): 0.15 μm, average aspect ratio: 7, BET specific surface area: 52 m²/g) | 80.0 parts by mass |
| Carbon black (non-magnetic filler) (average particle diameter: 20 nm) | 20.0 parts by mass |
| Vinyl chloride resin (binder) (trade name: MR-104, ZEON CORPORATION) | 13.0 parts by mass |

-continued

<Makeup of composition for forming backcoat layer>

| | |
|---|---|
| SO₃Na group-containing polyurethane resin (binder) (weight-average molecular weight: 50,000, SO₃Na group: 0.07 meq/g) | 6.0 parts by mass |
| Phenylphosphonic acid (surface modifier) | 3.0 parts by mass |
| Methyl ethyl ketone (organic solvent; for dilution) | 155.0 parts by mass |
| Cyclohexanone (organic solvent; for dilution) | 155.0 parts by mass |
| Stearic acid (lubricant) | 3.0 parts by mass |
| Butyl stearate (lubricant) | 3.0 parts by mass |
| Polyisocyanate (curing agent) (trade name: CORONATE (registered trademark) 3041, Tosoh Corporation) | 5.0 parts by mass |
| Cyclohexanone (organic solvent) | 200.0 parts by mass |

4. Preparation of Magnetic Tape

A support made of biaxially stretched polyethylene terephthalate having a thickness of 5.0 μm (that is, a non-magnetic support) was coated with the composition for forming a non-magnetic layer such that the thickness thereof became 100 nm after drying, and the composition was dried, thereby forming a non-magnetic layer.

Then, the formed non-magnetic layer was coated with the composition for forming a magnetic layer such that the thickness thereof became 70 nm after drying, thereby forming a layer of the composition for forming a magnetic layer (step F). While the formed layer of the composition for forming a magnetic layer is being in a wet state (so-called undried state), a vertical alignment treatment was performed by applying a magnetic field with a magnetic field intensity of 0.60 T to the layer of the composition for forming a magnetic layer in a direction perpendicular to the surface of the layer by using electromagnets disposed to face each other (step G). Thereafter, the layer of the composition for forming a magnetic layer was dried, thereby forming a magnetic layer (step H).

Subsequently, a surface of the non-magnetic support that was opposite to a surface on which the non-magnetic layer and the magnetic layer were formed was coated with the composition for forming a backcoat layer such that the thickness thereof became 0.4 μm after drying, thereby forming a backcoat layer. In this way, a laminate constituted with hardcoat layer/non-magnetic support/non-magnetic layer/magnetic layer was obtained.

Then, by using a pair of calender rolls constituted only with metal rolls, a surface smoothing treatment (so-called calender treatment) was performed on the obtained laminate under the conditions of a calender treatment speed of 100 m/min, a line pressure of 300 kg/cm (294 kN/m), and a calender roll surface temperature of 100° C. Thereafter, a heat treatment was performed for 36 hours in an environment with an atmospheric temperature of 70° C.

After the heat treatment, the laminate was cut in a width of ½ inches (0.0127 meters), thereby obtaining a magnetic tape.

[Evaluation]

1. SQ in Longitudinal Direction of Magnetic Recording Medium

For the magnetic tape of Example 1 prepared as above, SQ measured in the longitudinal direction thereof was evaluated.

In an environment with an atmospheric temperature of 23° C., the magnetic tape was installed in a direction along which the longitudinal direction of the magnetic tape became parallel with the direction of a magnetic field applied thereto, the magnetic field was swept in a range of applied magnetic field±1,194 kA/m (15 kOe) so as to measure the magnetization intensity of the magnetic tape in the longitudinal direction with respect to the applied magnetic field. The magnetic field sweep speed was set to be 6.7 kA/m/s (second) [84 Oe/s (second)].

SQ in the longitudinal direction is represented by Mr/Ms by using a magnetization intensity Ms (saturation magnetization) at an applied magnetic field of 1,194 kA/m and a magnetization intensity Mr (residual magnetization) at an applied magnetic field of 0 kA/m.

The results are shown in Table 1.

2. SNR

For the magnetic tape of Example 1 prepared as above, SNR was evaluated. For the evaluation, a magnetic tape cut in a length of 100 m was used.

By using a ½-inch (0.0127-meter) reel tester to which a head was fixed, the magnetic tape was allowed to run under the following running conditions, and magnetic signals were recorded thereon on the longitudinal direction of the magnetic tape and reproduced under the following recording/reproduction conditions.

—Running Conditions—

Transport speed (relative speed of head/tape): 6.0 m/s (second)

Length per 1 pass: 1,000 m

Number of times of running: reciprocating 1,000 passes

—Recording/Reproduction Conditions—

(Recording)

Recording head: Metal-In-Gap (MIG) head

Recording track width: 1.0 µm

Recording gap: 0.15 µm

Saturated flux density of head (Bs): 1.8 T

Recording current: recording current optimal for each magnetic tape (Reproduction)

Reproducing head: Giant Magneto Resistive (GMR) effect head

Reproducing track width: 0.5 µm

Distance between shields (sh) (sh-sh distance): 0.1 µm

Element thickness: 15 nm

Linear recording density: 270 kfci (fci: flux change per inch; the same shall be applied hereinafter.)

By using a spectrum analyzer from Shibasoku Co., Ltd., frequency analysis was performed on the reproduced signals, and a ratio between the output of 300 kfci and the noise integrated in a range of 0 kfci to 600 kfci was adopted as SNR. SNR was determined after the signals were thoroughly stabilized since the running of the magnetic tape had finished.

Whether or not SNR of the magnetic tape is good was determined based on a difference in SNR obtained using SNR of the magnetic tape of Comparative Example 1 as a reference. Specifically, a magnetic tape exhibiting SNR higher than SNR of the magnetic tape of Comparative Example 1 by equal to or higher than +1.0 dB was determined as having excellent SNR. The results are shown in Table 1.

Examples 2 and 3

Particles of a magnetic substance 2 and a magnetic substance 3 were prepared in the same manner as in Example 1, except that in Example 1, the amount of methyl ethyl ketone and cyclohexanone as organic solvents used in the step D at the time of preparing the particles of the magnetic substance 1 was changed to the amount described in Table 1. Furthermore, magnetic tapes were manufactured in the same manner as in Example 1.

The obtained magnetic substances and magnetic tapes were evaluated in the same manner as in Example 1. The results are also shown in the following Table 1.

Example 4

Particles of a magnetic substance 4 were prepared in the same manner as in Example 1, except that in Example 1, the temperature of the mixed solution, to which an alkali agent was added in the step B, at the time of preparing the particles of the magnetic substance 1 was changed as described in Table 1, and the firing temperature of the particles was changed as described in Table 1. Furthermore, a magnetic tape was manufactured in the same manner as in Example 1.

The obtained magnetic substance and magnetic tape were evaluated in the same manner as in Example 1. The results are also shown in the following Table 1.

Example 5

Particles of a magnetic substance 5 were prepared in the same manner as in Example 1, except that in Example 1, the temperature of the mixed solution after heating in the step C at the time of preparing the particles of the magnetic substance 1 was changed as described in Table 1. Furthermore, a magnetic tape was manufactured in the same manner as in Example 1.

The obtained magnetic substance and magnetic tape were evaluated in the same manner as in Example 1. The results are also shown in the following Table 1.

Example 6

Particles of a magnetic substance 6 were prepared in the same manner as in Example 1, except that in Example 1, the heating temperature for firing at the time of preparing the particles of the magnetic substance 1 was changed as described in Table 1. Furthermore, a magnetic tape was manufactured in the same manner as in Example 1.

The obtained magnetic substance and magnetic tape were evaluated in the same manner as in Example 1. The results are also shown in the following Table 1.

Example 7

In Example 1, the initially used metal salts for preparing the particles of the magnetic substance 1 were changed to 33.2 g of iron (III) nitrate nonahydrate, 5.6 g of aluminum (III) nitrate nonahydrate, 856 mg of cobalt (II) nitrate hexahydrate, and 648 mg of titanium (IV) sulfate. Except for this, particles of a magnetic substance 7 were prepared in the same manner as in Example 1, and a magnetic tape was manufactured in the same manner as in Example 1.

The obtained magnetic substance and magnetic tape were evaluated in the same manner as in Example 1. The results are also shown in the following Table 1.

Example 8

In Example 1, the initially used metal salts for preparing the particles of the magnetic substance 1 were changed to 29.7 g of iron (III) nitrate nonahydrate and 11.8 g of gallium (III) nitrate octahydrate. Except for this, particles of a magnetic substance 8 were prepared in the same manner as in Example 1, and a magnetic tape was manufactured in the same manner as in Example 1.

The obtained magnetic substance and magnetic tape were evaluated in the same manner as in Example 1. The results are also shown in the following Table 1.

Comparative Examples 1 and 2

Particles of a comparative magnetic substance 1 and a comparative magnetic substance 2 were prepared in the same manner as in Example 1, except that in Example 1, the amount of methyl ethyl ketone and cyclohexanone as organic solvents used in the step D at the time of preparing the particles of the magnetic substance 1 was changed as described in Table 1. Furthermore, magnetic tapes were manufactured in the same manner as in Example 1.

The obtained magnetic substances and magnetic tapes were evaluated in the same manner as in Example 1. The results are also shown in the following Table 1.

Comparative Example 3

Particles of a comparative magnetic substance 3 were prepared in the same manner as in Example 1, except that in Example 1, the temperature of the mixed solution, to which an alkali agent was added in the step B, at the time of preparing the particles of the magnetic substance 1 was changed as described in Table 1, and the temperature of the mixed solution in the step C was not increased from the condition in the step B. Furthermore, a magnetic tape was manufactured in the same manner as in Example 1.

The obtained magnetic substance and magnetic tape were evaluated in the same manner as in Example 1. The results are also shown in the following Table 1.

Comparative Example 4

Particles of a comparative magnetic substance 4 were prepared in the same manner as in Example 1, except that the temperature of the mixed solution after heating in the step C was changed as described in Table 1. Furthermore, a magnetic tape was manufactured in the same manner as in Example 1.

The obtained magnetic substance and magnetic tape were evaluated in the same manner as in Example 1. The results are also shown in the following Table 1.

TABLE 1

| | Composition | | | | | Reaction condition at the time of $\beta$-FeOOH synthesis | | | Firing temperature (° C.) | Average equivalent circular diameter (nm) | Aspect ratio |
|---|---|---|---|---|---|---|---|---|---|---|---|
| | Fe | Ga | Al | Co | Ti | Temperature at the time of adding alkali agent (° C.) | Heating after addition of alkali agent | Temperature after heating (° C.) | | | |
| Example 1 | 1.62 | 0.28 | 0 | 0.05 | 0.05 | 10 | Performed | 80 | 1,025 | 13.6 | 1.18 |
| Example 2 | 1.62 | 0.28 | 0 | 0.05 | 0.05 | 10 | Performed | 80 | 1,025 | 13.6 | 1.18 |
| Example 3 | 1.62 | 0.28 | 0 | 0.05 | 0.05 | 10 | Performed | 80 | 1,025 | 13.6 | 1.18 |
| Example 4 | 1.62 | 0.28 | 0 | 0.05 | 0.05 | 25 | Performed | 80 | 1,015 | 13.7 | 1.24 |
| Example 5 | 1.62 | 0.28 | 0 | 0.05 | 0.05 | 10 | Performed | 60 | 1,025 | 13.4 | 1.23 |
| Example 6 | 1.62 | 0.28 | 0 | 0.05 | 0.05 | 10 | Performed | 80 | 1,010 | 10.7 | 1.19 |
| Example 7 | 1.65 | 0 | 0.25 | 0.05 | 0.05 | 10 | Performed | 80 | 1,025 | 13.5 | 1.20 |
| Example 8 | 1.46 | 0.54 | 0 | 0 | 0 | 10 | Performed | 80 | 1,025 | 13.6 | 1.19 |
| Comparative Example 1 | 1.62 | 0.28 | 0 | 0.05 | 0.05 | 10 | Performed | 80 | 1,025 | 13.6 | 1.18 |
| Comparative Example 2 | 1.62 | 0.28 | 0 | 0.05 | 0.05 | 10 | Performed | 80 | 1,025 | 13.6 | 1.18 |
| Comparative Example 3 | 1.62 | 0.28 | 0 | 0.05 | 0.05 | 25 | N/A | 25 | 1,020 | 13.5 | 1.29 |
| Comparative Example 4 | 1.62 | 0.28 | 0 | 0.05 | 0.05 | 10 | N/A | 95 | 1,020 | 13.7 | 1.21 |

| | Coefficient of variation of aspect ratio (%) | Amount of solvents in magnetic liquid (part by mass) | | Amount of cyclohexanone with respect to composition for forming magnetic layer (%) | Longitudinal SQ of medium | SNR of medium (dB) (with respect to Comparative Example 1) |
|---|---|---|---|---|---|---|
| | | Methyl ethyl ketone | Cyclohexanone | | | |
| Example 1 | 12.8 | 260 | 40 | 31.4 | 0.37 | +1.6 |
| Example 2 | 12.8 | 220 | 80 | 38.6 | 0.32 | +0.9 |
| Example 3 | 12.8 | 280 | 20 | 27.8 | 0.48 | +0.7 |
| Example 4 | 17.4 | 260 | 40 | 31.4 | 0.41 | +1.1 |
| Example 5 | 15.9 | 260 | 40 | 31.4 | 0.39 | +1.3 |
| Example 6 | 12.9 | 260 | 40 | 31.4 | 0.44 | +1.5 |
| Example 7 | 13.7 | 260 | 40 | 31.4 | 0.39 | +1.4 |
| Example 8 | 14.3 | 260 | 40 | 31.4 | 0.41 | +1.3 |
| Comparative Example 1 | 12.8 | 150 | 150 | 51.4 | 0.28 | +0.0 |
| Comparative Example 2 | 12.8 | 290 | 10 | 26.0 | 0.53 | −0.4 |
| Comparative Example 3 | 18.6 | 260 | 40 | 31.4 | 0.39 | −0.5 |
| Comparative Example 4 | 18.1 | 260 | 40 | 31.4 | 0.41 | −0.1 |

As is evident from the results shown in Table 1, the coefficient of variation of the aspect ratio was equal to or smaller than 18% in all of the particles of the magnetic substances obtained in Example 1 to Example 8. Furthermore, in the magnetic tapes obtained in Example 1 to Example 8, SQ measured in the longitudinal direction was within a range higher than 0.3 and equal to or lower than 0.5. In addition, SNR of all of the magnetic tapes obtained in Example 1 to Example 8 was better than SNR of the magnetic tape of Comparative Example 1 adopted as a standard.

In contrast, in the magnetic tape of Comparative Example 2, although the coefficient of variation of the aspect ratio of the particles of the magnetic substance was equal to or smaller than 18%, SQ in the longitudinal direction was outside the range of the present disclosure. Furthermore, SNR of the magnetic tape of Comparative Example 2 was poorer than SNR of the magnetic tapes of examples.

In both the magnetic tape of Comparative Example 3, in which heating was not performed in the step C, and magnetic tape of Comparative Example 4, in which the temperature after heating in the step C was too high, the coefficient of variation of the aspect ratio of the obtained particles of the magnetic substance was greater than 18%. Furthermore, SNR of the magnetic tapes of Comparative Examples 3 and 4 was poorer than SNR of the magnetic tapes of examples.

From these results, it was confirmed that in a case where the coefficient of variation of the aspect ratio is equal to or smaller than 18%, and SQ in the longitudinal direction is higher than 0.3 and equal to or lower than 0.5, SNR of the obtained magnetic recording medium is excellent.

Furthermore, by adjusting the content ratio of an organic solvent having a boiling point equal to or higher than 155° C. in the organic solvents used for preparing the composition for forming a magnetic layer, the SQ ratio in the longitudinal direction can be easily adjusted to fall into an excellent range.

The disclosure of JP2019-035760 filed on Feb. 28, 2019 is incorporated herein in its entirety by reference.

All publications, patent applications, and technical standards mentioned in this specification are incorporated herein by reference to the same extent as if each individual publication, patent application, or technical standard was specifically individually indicated to be incorporated by reference.

What is claimed is:

1. A magnetic recording medium comprising:
ε-type iron oxide particles,
wherein a coefficient of variation of an aspect ratio of the ε-type iron oxide particles is equal to or smaller than 18%, and
a squareness ratio of the magnetic recording medium measured in a longitudinal direction of the magnetic recording medium is higher than 0.3 and equal to or lower than 0.5
wherein the aspect ratio of the ε-type iron oxide particles is within a range of 1.18 to 1.35.

2. The magnetic recording medium according to claim 1, wherein an average equivalent circular diameter of the ε-type iron oxide particles is within a range of 8.0 nm to 15.0 nm.

* * * * *